US 9,491,352 B2

United States Patent
Iwasaki

(10) Patent No.: US 9,491,352 B2
(45) Date of Patent: Nov. 8, 2016

(54) IMAGING DEVICE, SIGNAL PROCESSING METHOD, AND SIGNAL PROCESSING PROGRAM

(71) Applicant: FUJIFILM Corporation, Tokyo (JP)

(72) Inventor: Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/853,397

(22) Filed: Sep. 14, 2015

(65) Prior Publication Data
US 2016/0014327 A1  Jan. 14, 2016

Related U.S. Application Data

(63) Continuation of application No. PCT/JP2013/084314, filed on Dec. 20, 2013.

(30) Foreign Application Priority Data

Mar. 13, 2013 (JP) .................................. 2013-050238

(51) Int. Cl.
| | |
|---|---|
| H04N 5/232 | (2006.01) |
| G02B 7/34 | (2006.01) |
| H04N 9/04 | (2006.01) |
| G02B 7/28 | (2006.01) |

(Continued)

(52) U.S. Cl.
CPC ............ *H04N 5/23212* (2013.01); *G02B 7/28* (2013.01); *G02B 7/34* (2013.01); *G06T 3/4007* (2013.01); *H04N 9/045* (2013.01); *G03B 13/36* (2013.01); *G03B 17/14* (2013.01)

(58) Field of Classification Search
None
See application file for complete search history.

(56) References Cited

U.S. PATENT DOCUMENTS

| 8,970,720 B2 * | 3/2015 | Razavi | ............... H04N 5/23241 348/222.1 |
| 9,264,636 B2 * | 2/2016 | Sugawara | ................ G02B 7/34 |

(Continued)

FOREIGN PATENT DOCUMENTS

| JP | 2007-19959 A | 1/2007 |
| JP | 2007-282108 A | 10/2007 |

(Continued)

OTHER PUBLICATIONS

International Search Report, issued in PCT/JP2013/084314, dated Mar. 11, 2014.
Written Opinion of the International Searching Authority, issued in PCT/JP2013/084314, dated Mar. 11, 2014.

*Primary Examiner* — Michael Osinski
(74) *Attorney, Agent, or Firm* — Birch, Stewart, Kolasch & Birch, LLP

(57) ABSTRACT

There is provided a lens-exchangeable imaging device that is capable of correcting an output signal of a pixel for phase difference detection at high speed and with high precision. A camera main body 200 includes a correction method selection unit 174 that selects any of a method in which the output signals of all the pixels for phase difference detection that are included in a solid-state imaging element 5 are interpolation-corrected by an interpolation correction processing unit 172 and a method in which the output signals of all the phase difference detection are gain-corrected by a gain correction processing unit 171, according to lens information that is acquired from a lens device 100, and an image processing unit 175 that corrects the output signal of the pixel for phase difference detection, using the selected method.

7 Claims, 13 Drawing Sheets

(51) Int. Cl.
*G06T 3/40* (2006.01)
*G03B 13/36* (2006.01)
*G03B 17/14* (2006.01)

(56) References Cited

U.S. PATENT DOCUMENTS

| | | | |
|---|---|---|---|
| 2007/0236598 A1 | 10/2007 | Kusaka | |
| 2010/0097503 A1 | 4/2010 | Aragaki | |
| 2011/0085785 A1 | 4/2011 | Ishii | |
| 2012/0019704 A1* | 1/2012 | Levey | H04N 5/23241 348/335 |
| 2012/0236185 A1 | 9/2012 | Ishii | |
| 2013/0050523 A1* | 2/2013 | Kodama | H04N 5/2253 348/222.1 |
| 2013/0076930 A1* | 3/2013 | Border | H04N 5/23229 348/222.1 |
| 2015/0365583 A1* | 12/2015 | Higuma | H04N 5/23212 348/231.6 |
| 2016/0006925 A1* | 1/2016 | Yamada | H04N 5/23212 348/703 |

FOREIGN PATENT DOCUMENTS

| | | |
|---|---|---|
| JP | 2009-8928 A | 1/2009 |
| JP | 2009-44636 A | 2/2009 |
| JP | 2010-39759 A | 2/2010 |
| JP | 2010-91848 A | 4/2010 |
| JP | 2011-81271 A | 4/2011 |
| JP | 2011-124704 A | 6/2011 |
| JP | 2011-257565 A | 12/2011 |

* cited by examiner

FIG. 10

| OPTICAL CONDITION 3 | HORIZONTAL PIXEL POSITION | | | |
|---|---|---|---|---|
| OPTICAL CONDITION 2 | HORIZONTAL PIXEL POSITION | | | |
| OPTICAL CONDITION 1 | HORIZONTAL PIXEL POSITION | | | |
| | $x1$ | $x2$ | $x3$ | $x4$ |
| UPPER LIGHT BEAM ANGLE | $\theta 1a$ | $\theta 2a$ | $\theta 3a$ | $\theta 4a$ |
| LOWER LIGHT BEAM ANGLE | $\theta 1b$ | $\theta 2b$ | $\theta 3b$ | $\theta 4b$ |

FIG. 11

| | | UPPER LIGHT BEAM ANGLE | | | | |
|---|---|---|---|---|---|---|
| | | $\theta 1a$ | $\theta 2a$ | $\theta 3a$ | $\theta 4a$ | ... |
| LOWER LIGHT BEAM ANGLE | $\theta 1b$ | L1,R1 | L3,R3 | | | |
| | $\theta 2b$ | L2,R2 | | | | |
| | $\theta 3b$ | | | | | |
| | $\theta 4b$ | | | | | |
| | ⋮ | | | | | |

IMAGING DEVICE, SIGNAL PROCESSING METHOD, AND SIGNAL PROCESSING PROGRAM

CROSS REFERENCE TO RELATED APPLICATION

This is a continuation of International Application No. PCT/JP2013/084314 filed on Dec. 20, 2013, and claims priority from Japanese Patent Application No. 2013-050238, filed on Mar. 13, 2013, the entire disclosures of which are incorporated herein by reference.

TECHNICAL FIELD

The present invention relates to an imaging device, a signal processing method, and a signal processing program.

BACKGROUND ART

In recent years, as solid-state imaging elements, such as a charge coupled device (CCD) image sensor and a complementary metal oxide semiconductor (CMOS) image sensor have had high resolution, there is a rapidly-increasing demand for information devices having a photographing function, such as a digital still camera, a digital video camera, a portable telephone, and a personal digital assistant (PDA). Moreover, the information device having an imaging function as described above is referred to as an imaging device.

As a focusing control method of focusing on a main photographic subject, there are a contrast AF (an auto focus (AF)) type and a phase difference AF type. The phase difference AF type can detect a focusing position at high speed with high precision compared with the contrast AF type, and, for this reason, is mostly employed in various imaging devices.

As a solid-state imaging element that is mounted in an imaging device which performs focusing control using the phase difference AF type, for example, a solid-state imaging element is used in which a pair of pixels for phase difference detection, on which openings in a light shielding film are decentered in the opposite directions, is discretely provided on an entire light receiving surface (refer to Patent Literatures 1 to 4).

Because an area of the opening in the light shielding film in the pixel for phase difference detection is smaller than in a different normal pixel (a pixel for imaging), the use of an output signal of the pixel for phase difference detection as an imaging-obtained image signal is insufficient. Then, there occurs a need to correct the output signal of the pixel for phase difference detection.

Patent Literatures 1 to 4 disclose an imaging device in which an interpolation correction processing that interpolation-generates the output signal for the pixel for phase difference detection using an output signal of a normal pixel in the vicinity of the pixel for phase difference detection and a gain correction processing that corrects the output signal for the pixel for phase difference detection by gain-amplifying the output signal are used together.

Patent Literature 5 discloses that processing which interpolation-generates the output signal for the pixel for phase difference detection using an output signal of a normal pixel in the vicinity of the pixel for phase difference detection is performed in the lens-exchangeable camera.

Patent Literature 6 discloses a camera in which a threshold for determining whether or not a pixel in a solid-state imaging element is a defective pixel is caused to differ using lens information that is acquired from a lens device.

CITATION LIST

Patent Literature

Patent Literature 1: JP-A-2009-44636
Patent Literature 2: JP-A-2011-124704
Patent Literature 3: JP-A-2011-81271
Patent Literature 4: JP-A-2007-282108
Patent Literature 5: JP-A-2010-91848
Patent Literature 6: JP-A-2007-19959

SUMMARY OF INVENTION

Technical Problem

In a lens-exchangeable camera that is disclosed in Patent Literatures 5 and 6, the output of the pixel for phase difference detection differs by combining an imaging element that is built into the camera and a lens that is mounted on the camera. For example, a light beam angle to an imaging element differs due to a lens, and the amount of light that enters the pixel for phase difference detection with respect to the light beam angle changes complicatedly due to a shape of the light shielding film on the imaging element, a positional relation of a photoelectric conversion area within a silicon substrate, or the like.

For this reason, in a case where the output signal of the pixel for phase difference detection in the lens-exchangeable camera is gain-corrected, there is a need for all lenses mountable on the camera to retain a gain value in advance. However, the storing of a correction gain value corresponding to all lenses in a camera brings about an increase in the cost of manufacturing a camera. Furthermore, new exchangeable lenses are always available on the market, but because there is no correction gain value for these new exchangeable lenses, gain correction cannot be performed.

In Patent Literatures 1 to 6, it is not considered how the output signal of the pixel for phase difference detection is corrected in a case where an exchangeable lens, for which the correction gain value is not stored, is mounted on the lens-exchangeable camera.

Solution to Problem

An object of the present invention, which is made in view of the situation described above, is to provide a lens-exchangeable imaging device that is capable of correcting an output signal of a pixel for phase difference detection at high speed with high precision even in a case where any lens is mounted.

Solution to Problem

An imaging device of the present invention is an imaging device to which a lens device is capable of being detachably mounted, comprising: an imaging element that includes multiple pixels for imaging arranged into a two-dimensional array and multiple pixels for phase difference detection on a light receiving surface and that images a photographic subject through the lens device; a communication unit for performing communication with the mounted lens device; a lens information acquisition unit that acquires lens information that is information specific to the lens device, from the lens device through the communication unit; a gain correction processing unit that performs gain correction processing which corrects an output signal of the pixel for phase difference detection in an imaging-obtained image signal that is obtained by the imaging element imaging the photographic subject, by multiplying the output signal by a gain value; an interpolation correction processing unit that performs interpolation correction processing which corrects the output signal of the pixel for phase difference detection in the imaging-obtained image signal by replacing the output signal with a signal that is generated using an output signal of the pixel for imaging that is in the vicinity of the pixel for phase difference detection and that detects the same color as the pixel for phase difference detection; a correction method selection unit that selects according to the lens information that is acquired by the lens information acquisition unit, any of a first correction method in which the output signals of all the pixels for phase difference detection in the imaging-obtained image signal are corrected by the interpolation correction processing unit, a second correction method in which the output signals of all the pixels for phase difference detection in the imaging-obtained image signal are corrected by the gain correction processing unit, and a third correction method in which the output signal of each pixel for phase difference detection in the imaging-obtained image signal is corrected by any of the interpolation correction processing unit and the gain correction processing unit; and an image processing unit that corrects the output signal of the pixel for phase difference detection in the imaging-obtained image signal, using the method that is selected by the correction method selection unit.

A signal processing method of the present invention is a signal processing method for use in an imaging device to which a lens device is capable of being detachably mounted, the imaging device including an imaging element that includes multiple pixels for imaging arranged into a two-dimensional array and multiple pixels for phase difference detection on a light receiving surface and that images a photographic subject through the lens device, and a communication unit for performing communication with the mounted lens device, the signal processing method comprising: a lens information acquisition step of acquiring lens information that is information specific to the lens device, from the lens device through the communication unit; a correction method selection step of selecting according to the lens information that is acquired by the lens information acquisition step, any of a first correction method in which the output signals of all the pixels for phase difference detection in the imaging-obtained image signal are corrected by interpolation correction processing that replaces the output signals with signals that are generated using an output signal of the pixel for imaging that is in the vicinity of the pixel for phase difference detection and that detects the same color as the pixel for phase difference detection, a second correction method in which the output signals of all the pixels for phase difference detection in the imaging-obtained image signal are corrected by the gain correction processing that corrects the output signals by multiplying the output signals by a gain value, and a third correction method in which the output signal of each pixel for phase difference detection in the imaging-obtained image signal is corrected by any of the interpolation correction processing and the gain correction processing; and an image processing step of correcting the output signal of the pixel for phase difference detection in the imaging-obtained image signal, using the method that is selected in the correction method selection step.

A signal processing program of the present invention is a program for causing a computer to perform each step of the signal processing method.

Advantageous Effects of Invention

According to the present invention, even in a case where any lens is mounted, a lens-exchangeable imaging device can be provided that is capable of correcting an output signal of a pixel for phase difference detection at high speed and with high precision.

BRIEF DESCRIPTION OF DRAWINGS

FIG. 10 is a diagram illustrating one example of data that is stored in a memory 60 of a lens device 100.

FIG. 11 is a diagram illustrating one example of a table that is stored in a main memory 16 of a camera main body 200.

DESCRIPTION OF EMBODIMENTS

Figure 1:
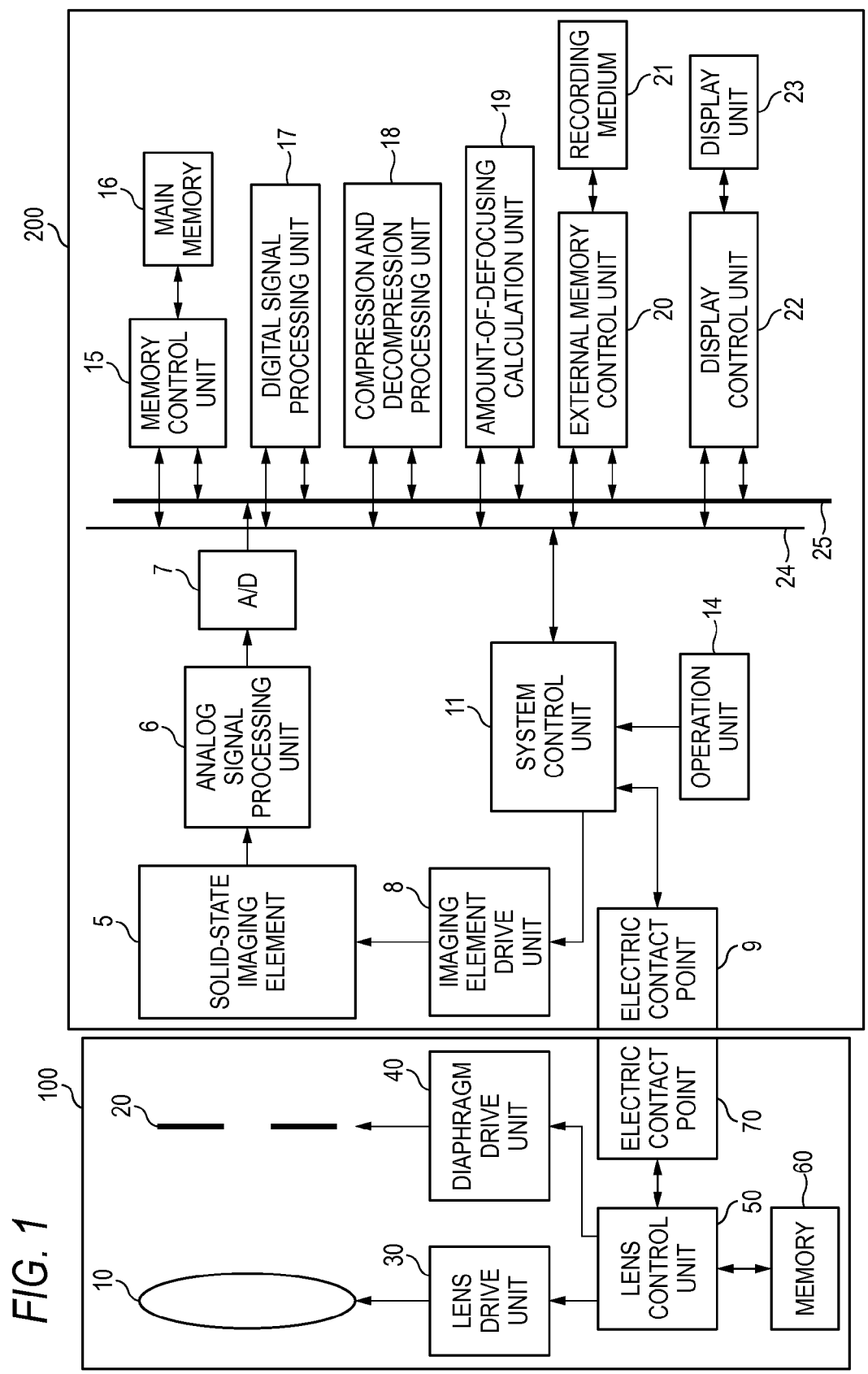
FIG. 1 is a diagram illustrating a schematic configuration of a digital camera as one example of an imaging device for describing one embodiment of the present invention.

Embodiments of the present invention will be described below referring to the drawings.

FIG. 1 is a diagram illustrating a schematic configuration of a digital camera as one example of an imaging device for describing one embodiment of the present invention.

The digital camera that is illustrated in FIG. 1 includes a lens device 100 as an imaging optical system and a camera main body 200 including a mount mechanism not illustrated, in which the lens device 100 is to be mounted. The lens device 100 is detachably attachable to the camera main body 200 and is replaceable with others.

The lens device 100 includes a photographing lens 10 that includes a focal lens, a zoom lens, and the like, a diaphragm 20, a lens drive unit 30, a diaphragm drive unit 40, a lens control unit 50 that integrally controls the entire lens device 100, a memory 60, and an electric contact point 70. The focal lens here is a lens that moves in an optical axis direction, and thus adjusts a focal point distance in a photographing optical system. The focal lens indicates a lens that adjusts a focal point position in a lens unit that is configured from multiple lenses and, in the case of lenses for all-group extension, indicates all groups as a whole.

According to an instruction from the lens control unit 50, the lens drive unit 30 is set to adjust position of the focal lens that is included in the photographing lens 10 and to perform adjustment of a position of the zoom lens that is included in the photographing lens 1.

According to the instruction from the lens control unit 50, the diaphragm drive unit 40 controls the amount of opening on the diaphragm 20, and thus performs adjustment of an amount of light exposure.

Lens information that is information specific to the lens device 100 is stored in the memory 60. The lens information includes at least a lens ID as identification information for identifying the lens device 100.

The electric contact point 70 is an interface for performing communication between the lens device 100 and the camera main body 200. The electric contact point 70 comes into contact with an electric contact point 9 that is provided on the camera main body 200, in a state where the lens device 100 is mounted on the camera main body 200. The electric contact point 9 functions as a communication unit for performing communication with the lens device 100.

The camera main body 200 includes a solid-state imaging element 5, such as a CCD type, a CMOS type, and the like, which images a photographic subject through the lens device 100, an analog signal processing unit 6 that is connected to an output of the solid-state imaging element 5 and that performs analog signal processing, such as correlative double sampling processing, and an A/D conversion circuit 7 that converts an analog signal that is output from the analog signal processing unit 6, into a digital signal. The analog signal processing unit 6 and the A/D conversion circuit 7 are controlled by a system control unit 11. The analog signal processing unit 6 and the A/D conversion circuit 7 are also built into the solid-state imaging element 5.

The system control unit 11 drives the solid-state imaging element 5 through an imaging element drive unit 8, and outputs an image of the photographic subject that is imaged by the photographing lens 10, as an imaging-obtained image signal. An instruction signal from a user is input into the system control unit 11 through an operation unit 14.

An electric control system of the digital camera further includes a main memory 16, a memory control unit 15 that is connected to the main memory 16, a digital signal processing unit 17 that performs interpolation calculation, gamma correction calculation, RGB/YC conversion processing, and the like on the imaging-obtained image signal that is output from the A/D conversion circuit 7 and a compression and decompression processing unit 18 that compresses the imaging-obtained image data which is generated in the digital signal processing unit 17, in a JPEG format, and decompresses the compressed image data, an amount-of-defocusing computation unit 19 that calculates the amount of defocusing, an external memory control unit 20 to which a recording medium 21 that is freely detachably attachable is connected, and a display control unit 22 to which a display unit 23 that is mounted on a rear surface of a camera. The memory control unit 15, the digital signal processing unit 17, the compression and decompression processing unit 18, the amount-of-defocusing computation unit 19, the external memory control unit 20, and the display control unit 22 are connected to each other through a control bus 24 and a data bus 25, and are controlled according to an instruction from the system control unit 11.

Figure 2:
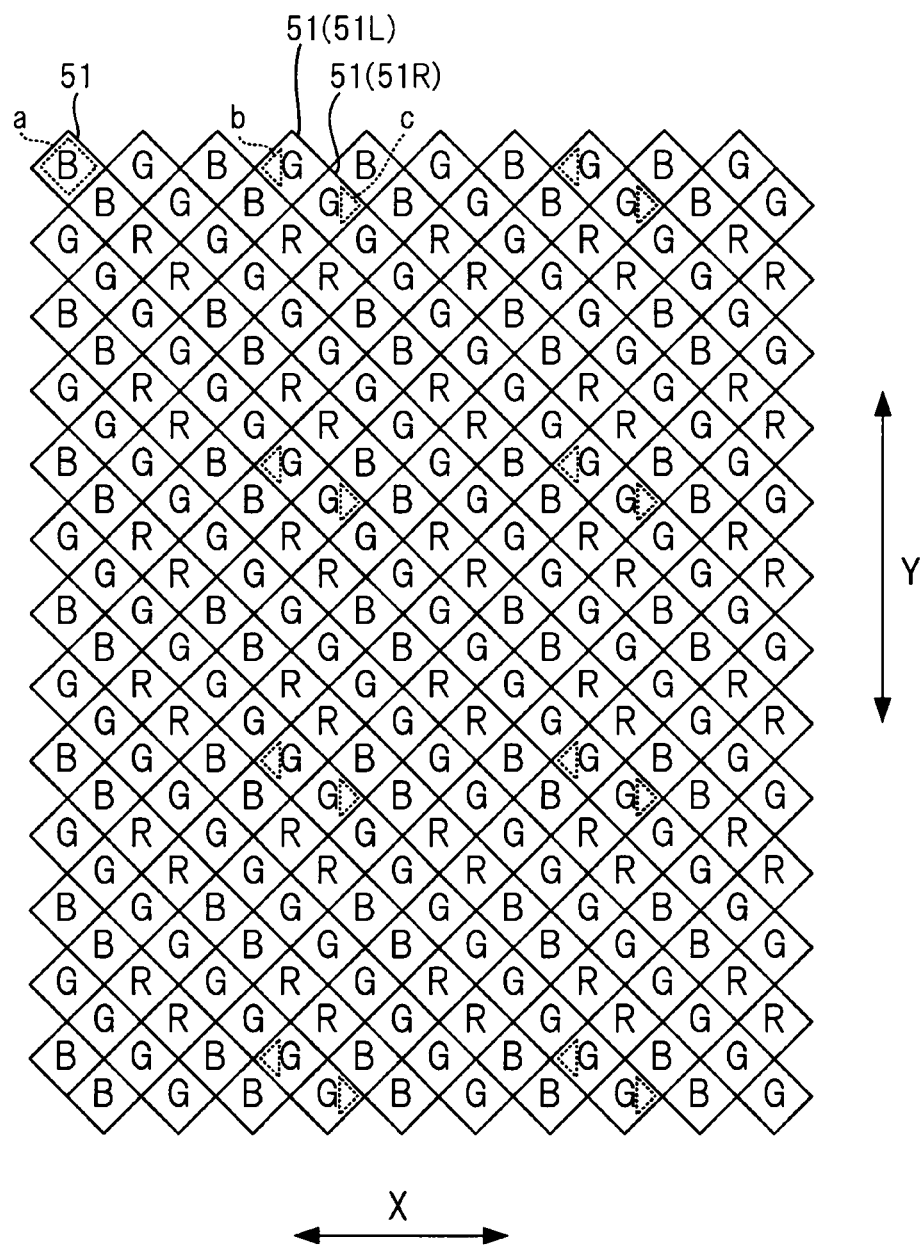
FIG. 2 is a diagram illustrating a planar configuration of a solid-state imaging element 5 that is mounted in the digital camera which is illustrated in FIG. 1, which results from enlarging a part of the solid-state imaging element 5.

FIG. 2 is a diagram illustrating a planar configuration of the solid-state imaging element 5 that is mounted in the digital camera which is illustrated in FIG. 1, which results from enlarging a part of the solid-state imaging element 5.

The solid-state imaging element 5 includes multiple pixels 51 (square blocks in the drawing) that are arranged two-dimensionally in the row direction X and the column direction Y that intersects the row direction X. All the pixels 51 are not illustrated in FIG. 2, and in practice, approximately several millions to ten millions of pixels 51 are two-dimensionally arranged. When the solid-state imaging element 5 performs imaging, an output signal is obtained from each of the multiple pixels 51. A set of multiple output signals that are obtained is referred to as an imaging-obtained image signal in the present specification.

Each pixel 51 includes a photoelectric conversion component such as a photo diode, and a color filter that is formed on the photoelectric component.

In FIG. 2, a letter "R" is assigned to a pixel 51 that includes a color filter that allows a red light to pass through, a letter "G" is assigned to a pixel 51 that includes a color filter that allows a green light to pass through, and a letter "B" is assigned to a pixel 51 that includes a color filter that allows a blue light to pass through.

Multiple pixels 51 are such that multiple rows of multiple pixels 51 that are arranged side by side in the row direction X are arranged side by side in the column direction Y. Then, odd-numbered pixel row and even-numbered pixel row are shifted by approximately half of an array pitch of pixels 51 in each pixel row in the row direction X.

An array of color filters that are included in pixels 51 in the odd-numbered pixel row is a Bayer array as a whole. Furthermore, an array of color filters that are included in pixels 51 in the even-numbered pixel row is a Bayer array as a whole as well. A pixel 51 in the odd-numbered row, and a pixel 51 that is vertically adjacent to the pixel 51 in the odd-numbered row and that detects the same color light as the pixel 51 in the odd-numbered row constitute a pair pixel.

With the solid-state imaging element 5 in this pixel array, output signals of two pixels 51 that constitute the pair pixel are added up and thus high-sensitivity of a camera can be achieved. Furthermore, exposure times of the two pixels 51 that constitute the pair pixel are changed and the output signals of the two pixels 51 are added up, and thus a broad dynamic range in the camera can be achieved.

In the solid-state imaging element 5, some of multiple pixels 51 are pixels for phase difference detection.

The pixels for phase difference detection include multiple pixels 51R for phase difference detection and multiple pixels 51L for phase difference detection.

The multiple pixels 51R for phase difference detection output signals according to an amount by which one pencil (for example, a pencil of light that passes through the right half of a pupil area) in a pair of pencils of light that pass through different parts of a pupil area of the photographing lens 1 is received. To be more precise, the multiple pixels 51R for phase difference detection, which are provided in the solid-state imaging element 5, captures an image that is formed by one pencil in the pair of pencils of light.

The multiple pixels 51L for phase difference detection output signals according to the amount by which the other pencil (for example, a pencil of light that passes through the left half of the pupil area) in the pair of pencils of light is received. To be more precise, the multiple pixels 51L for phase difference detection, which are provided in the solid-state imaging element 5, captures an image that is formed by the other pencil in the pair of pencils of light.

Moreover, multiple pixels 51 (hereinafter referred to as pixels for imaging) other than the pixels 51R and 51L for phase difference detection capture images that are formed by pencils of light that pass through almost all parts of the pupil area of the photographing lens 1.

A light shielding film is provided above the photoelectric conversion component of the pixel 51, and an opening that stipulates a light receiving area of the photoelectric conversion component is formed in the light shielding film.

The center of the opening (which is indicated by a letter a in FIG. 2) of a pixel 51 for imaging agrees with the center (the center of a square block) of the photoelectric conversion component of the pixel 51 for imaging. Moreover, in FIG. 2, the opening a in only one pixel 51 for imaging is illustrated for figure simplification.

In contrast, the center of an opening (which is indicated by a letter c in FIG. 2) in the pixel 51R for phase difference detection is decentered to the right side with respect to the center of the photoelectric conversion component of the pixel 51R for phase difference detection.

The center of an opening (which is indicated by a letter b in FIG. 2) in the pixel 51L for phase difference detection is decentered to the left side with respect to the center of the photoelectric conversion component of the pixel 51L for phase difference detection.

In the solid-state imaging element 5, one part of the pixel 51 on which a color filter for green is mounted is the pixel 51R for phase difference detection or the pixel 51L for phase difference detection. Of course, a pixel on which a color filter for different color is mounted may be set to be the pixel for phase difference detection.

Pairs (hereinafter referred to a phase difference pair) of the pixel 51R for phase difference detection and the pixel 51L for phase difference detection that is arranged adjacent to the pixel 51R for phase difference detection are arranged in a discrete and periodic manner in a light receiving surface 53 in which the pixels 51 are arranged.

In the present specification, two pixels that are adjacent to each other refers to two pixels that are adjacent to each other to the extent to which lights from parts of substantially the same photographic subject can be regarded as being received. Moreover, because the pixel 51R for phase difference detection and the pixel 51L for phase difference detection that constitute the phase difference pair are adjacent to each other, the pixel 51R and the pixel 51L are handled as being identical to each other in terms of a position in the row direction X (hereinafter also referred to as a horizontal pixel position).

In an example in FIG. 2, one pixel 51R for phase difference detection is arranged each time three pixels in the row direction X, in one part of the even-numbered pixel row (four pixel rows that are arranged side by side each time three pixel rows are arranged, in the example in FIG. 2).

In the example in FIG. 2, the pixel 51L for phase difference detection is arranged in the row direction X with the same period as the pixel 51R for phase difference detection in one part (a row of pixels which is adjacent to a row of pixels that include the pixel 51R for phase difference detection) of the odd-numbered pixel row.

With this configuration, a light that enters the pixel 51L for phase difference detection through the opening b in the light shielding film is mostly a light from the left side when viewed from the photographic subject whose image is seen through the photographing lens 1 that is provided in the direction from which a sheet of paper on which FIG. 2 is drawn is viewed, that is, a light that comes from the direction in which the photographic subject is viewed with the right eye. Furthermore, a light that enters the pixel 51R for phase difference detection through the opening c in the light shielding film is mostly a light from the right side when viewed from the photographic subject whose image is seen through the photographing lens 1, that is, a light that comes from the direction in which the photographic subject is viewed with the left eye.

That is, with all the pixels 51R for phase difference detection, the imaging-obtained image signal that results when the photographic subject is viewed with the left eye can be obtained, and with all the pixel 51L for phase difference detection, the imaging-obtained image signal that results when the photographic subject is viewed with the right eye can be obtained. For this reason, with a combination of the two imaging-obtained image signals, it is possible to generate stereoscopic image data on the photographic subject, and, with correlative computing operation of the two imaging-obtained image signals, it is possible to generate phase difference information.

Moreover, the pixel 51R for phase difference detection and the pixel 51L for phase difference detection can be set to receive the pencils of light that pass through different parts, respectively, of the pupil area of the photographing lens 1, by decentering the opening in the light shielding film in the reverse direction, and thus the phase difference information can be obtained. However, a structure for obtaining the phase difference information is not limited to this, a structure can be employed that is more widely known.

Figure 3:
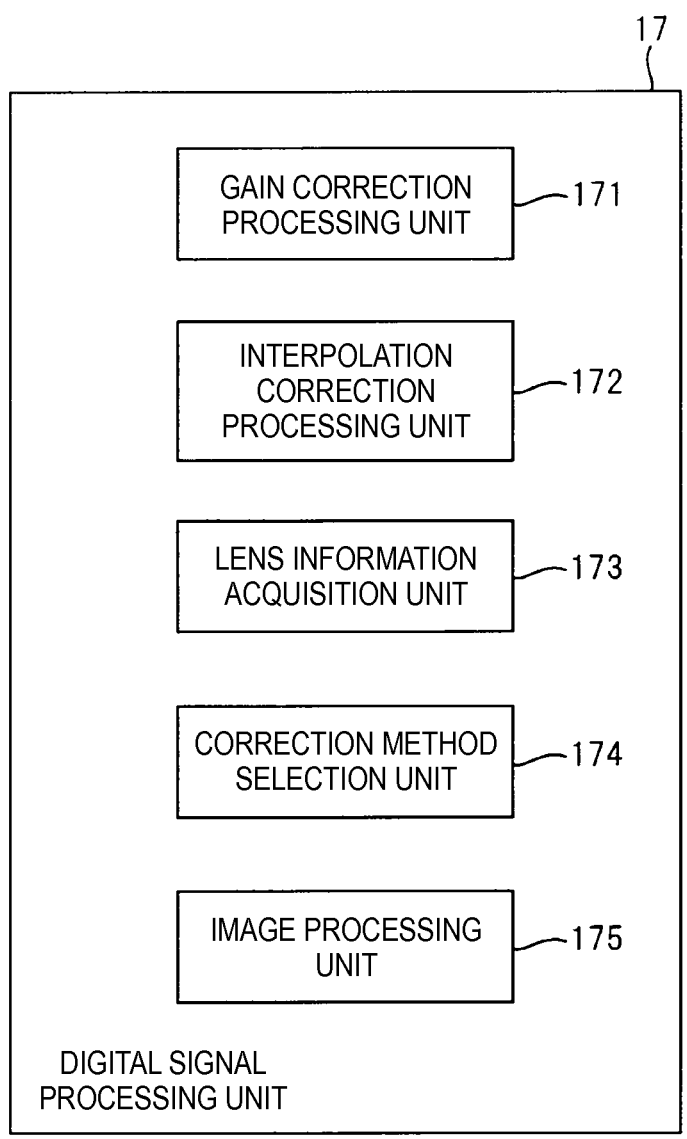
FIG. 3 is a functional block diagram of a digital signal processing unit 17 in the digital camera that is illustrated in FIG. 1.

FIG. 3 is a functional block diagram of the digital signal processing unit 17 in the digital camera that is illustrated in FIG. 1.

The digital signal processing unit 17 includes a gain correction processing unit 171, an interpolation correction processing unit 172, a lens information acquisition unit 173, a correction method selection unit 174, and an image processing unit 175. These are functional blocks that are formed by a program being executed by a processor that is included in the digital signal processing unit 17.

The gain correction processing unit 171 performs gain correction processing that corrects an output signal of a pixel for phase difference detection (hereinafter referred to as a correction target pixel), which is included in the imaging-obtained image signal, by multiplying the output signal by a gain value.

In a case where the lens device 100 that is mounted on the camera main body 200 is a genuine product that is manufactured by a maker of the camera main body 200, the gain value can be stored in advance in a memory of the camera main body 200. The gain value can be obtained from the imaging-obtained image signal that is obtained by capturing a reference image in an adjustment process before shipment of a digital camera. The gain value for every pixel 51 for phase difference detection in the genuine lens device 100 is stored in the main memory 16 of the camera main body 200, in a state of being associated with a lens ID for identifying the lens device 100. Moreover, the gain value may be generated and stored for every pixel 51 for phase difference detection. A light receiving surface of the solid-state imaging element 5 may be divided into blocks and one gain value may be generated and stored for every block.

The interpolation correction processing unit 172 performs correction by replacing an output signal of the correction target pixel with a signal that is generated using output signals of the pixels for imaging, which are in the vicinity of the correction target image and which detect the same color as that of the correction target pixel.

For example, in a case where the output signal of the correction target pixel is corrected by the interpolation correction processing, an output signal value of the correction target pixel is replaced with an average value of the output signals of the pixels for imaging, which are in the vicinity of the correction target image and which detect a G color light. The interpolation correction processing unit 172 may perform the correction by replacing the output signal of the correction target image with a copy of the output signal of any pixel for imaging that is in the vicinity of the correction target pixel.

The lens information acquisition unit 173 acquires the lens information that is stored in the memory 60 of the lens device 100, from the lens device 100 that is mounted on the camera main body 200.

According to the lens information that is acquired by the lens information acquisition unit 173, the correction method selection unit 174 selects any one of a first correction method in which, in the imaging-obtained image signal that is output from the solid-state imaging element 5, the output signals of all the pixels for phase difference detection are corrected by the interpolation correction processing unit 172, and a second correction method in which, in the imaging-obtained image signal that is output from the solid-state imaging element 5, the output signals of all the pixels for phase difference detection are corrected by the gain correction processing unit 171.

The image processing unit 175 corrects the output signal of the pixel for phase difference detection among the imaging-obtained image signals that are output from the solid-state imaging element 5, using the method that is selected by the correction method selection unit 174, and stores the post-correction imaging-obtained image signal in the main memory 16. Then, the image processing unit 175 performs known image processing operations, such as de-mosaic processing, y correction processing, white balance adjustment, on the recorded imaging-obtained image signal, and thus generates imaging-obtained image data, and record the imaging-obtained image data in the recording medium 21.

Moreover, the image processing unit 175 may record the post-correction imaging-obtained image signal in the recording medium 21 as raw data without any change.

Operation of the digital camera that is configured as described above is described.

Figure 4:
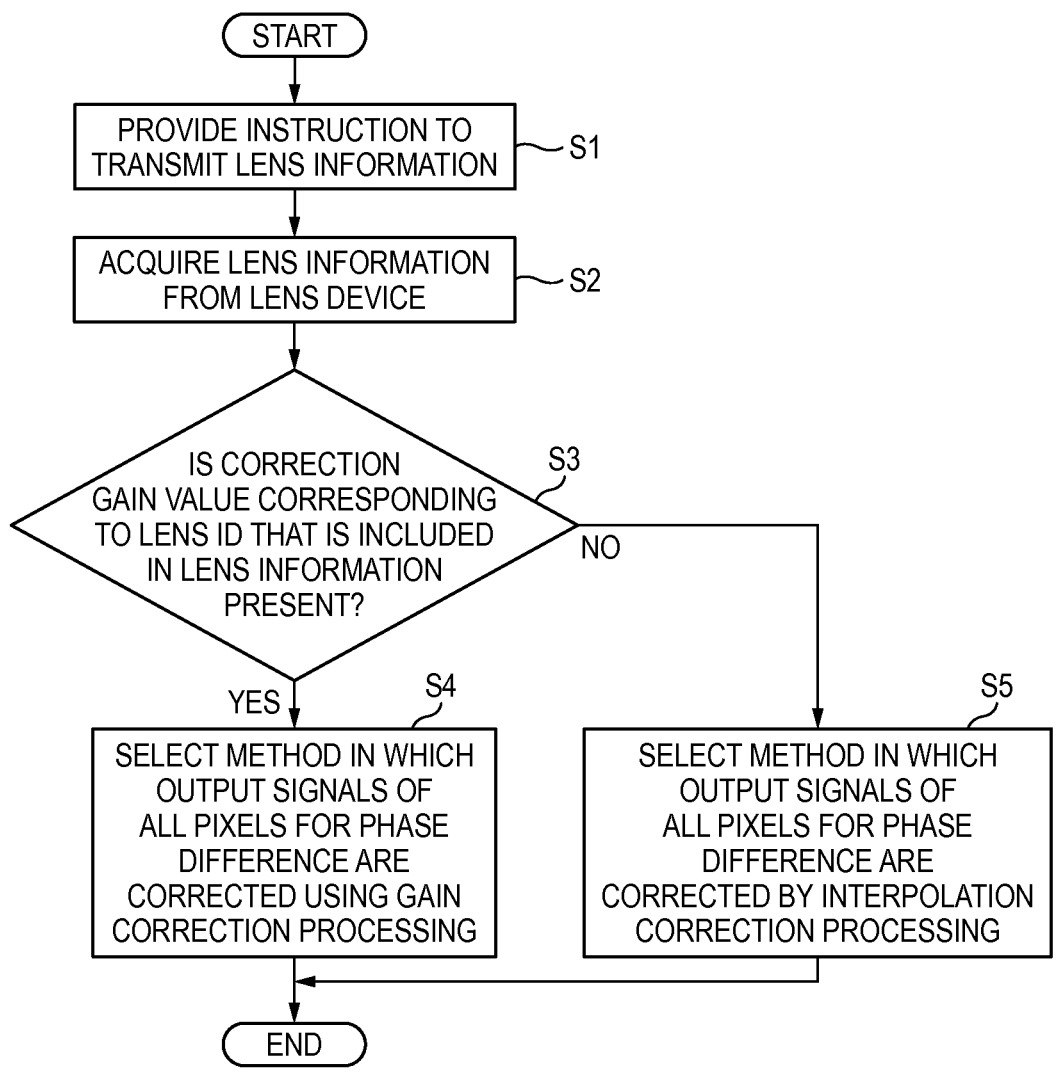
FIG. 4 is a flowchart for describing operation of the digital camera that is illustrated in FIG. 1.

FIG. 4 is a flowchart for describing the operation of the digital camera that is illustrated in FIG. 1.

In a state where the camera main body 200 is powered on, when the lens device 100 is mounted on the camera main body 200, the system control unit 11 of the camera main body 200 detects through the electric contact point 9 that the lens device 100 is attached. When it is detected that the lens device 100 is mounted, the system control unit 11 requests the lens device 100 to transmit lens information through the electric contact point 9 (Step S1).

When requested to transmit the lens information, the lens control unit 50 of the lens device 100 transmits the lens information that is stored in the memory 60, to the camera main body 200 through the electric contact point 70. The system control unit 11 receives the lens information that is transmitted from the lens device 100, and stores the received lens information temporarily in the main memory 16.

The digital signal processing unit 17 acquires the lens information that is stored in the memory 16 (Step S2), and searches the memory 16 for data with a correction gain value that is associated with a lens ID that is included in the lens information (Step S3).

In a case where such data is present, the digital signal processing unit 17 selects the second correction method in which, in the imaging-obtained image signal that is output from the solid-state imaging element 5, the output signals of all the pixels for phase difference detection is corrected by the gain correction processing unit 171 (Step S4). On the other hand, in a case where the data is not present, the digital signal processing unit 17 selects the first correction method in which, in the imaging-obtained image signal that is output from the solid-state imaging element 5, the output signals of all the pixels for phase difference detection is corrected by the interpolation correction processing unit 172 (Step S5).

When the processing operations in Steps S4 and S5 are finished, a photographing waiting state is attained. When a photographing instruction is present that is generated by pushing down on a shutter button which is included in the operation unit 14, photographing is performed by the solid-state imaging element 5 and the imaging-obtained image signal is output from the solid-state imaging element 5. The analog signal processing is performed on the imaging-obtained image signal, and then the imaging-obtained image signal is converted into a digital signal and is temporarily stored in the main memory 16.

Thereafter, the digital signal processing unit 17 corrects the output signal of the pixel 51 for phase difference detection in the imaging-obtained image signal that is stored in the main memory 16, according to the method that is selected in Step S4 or Step S5, processes a post-correction imaging-obtained image signal, generates imaging-obtained image data, stores the generated imaging-obtained image data on the recording medium 21, and thus ends imaging processing.

In this manner, in a case where the lens device 100 in which the correction gain value that is used for the gain correction processing is stored in the memory 16 and which is a genuine product that is manufactured by the maker of the camera main body 200 is mounted, the digital camera in FIG. 1 corrects the output signals of all the pixels 51 for phase difference detection using the gain correction processing. On the other hand, in a case where the lens device 100 in which the correction gain value is not stored in the memory 16 and which is a product that is manufactured by another maker is mounted, the output signals of all the pixels 51 for phase difference detection is corrected using the interpolation correction processing. For this reason, it is possible to perform the correction of the output signal of the pixel 51 for phase difference detection on all the lens device that are mountable on the camera main body 200 without any problem.

Furthermore, when the digital camera is used, there is no need to store the correction gain value that corresponds to the lens device 100 manufactured by another maker, in advance in the memory 16 of the camera main body 200. For this reason, the time taken to generate data can be reduced and memory capacity can be reduced. Thus, a cost of manufacturing a digital camera can be reduced.

Moreover, if the lens device 100 is a genuine product that is manufactured by the maker of the camera main body 200, it is considered that the correction gain value that corresponds to the lens device 100 is stored in the memory 60 of the lens device 100, not the camera main body 200, in a state of being associated with the lens ID.

In this case, the system control unit 11 determines in Step S3 in FIG. 4 whether or not the correction gain value that corresponds to the lens ID which is stored in the acquired lens information is included in any of the memory 16 of the camera main body 200 and the memory 60 of the lens device 100. The system control unit 11 performs processing in Step S4 if the correction gain value is stored, and performs processing in Step S5 if the correction gain value is not stored.

Next, a modification example of the digital camera that is illustrated in FIG. 1 is described.

Figure 5:
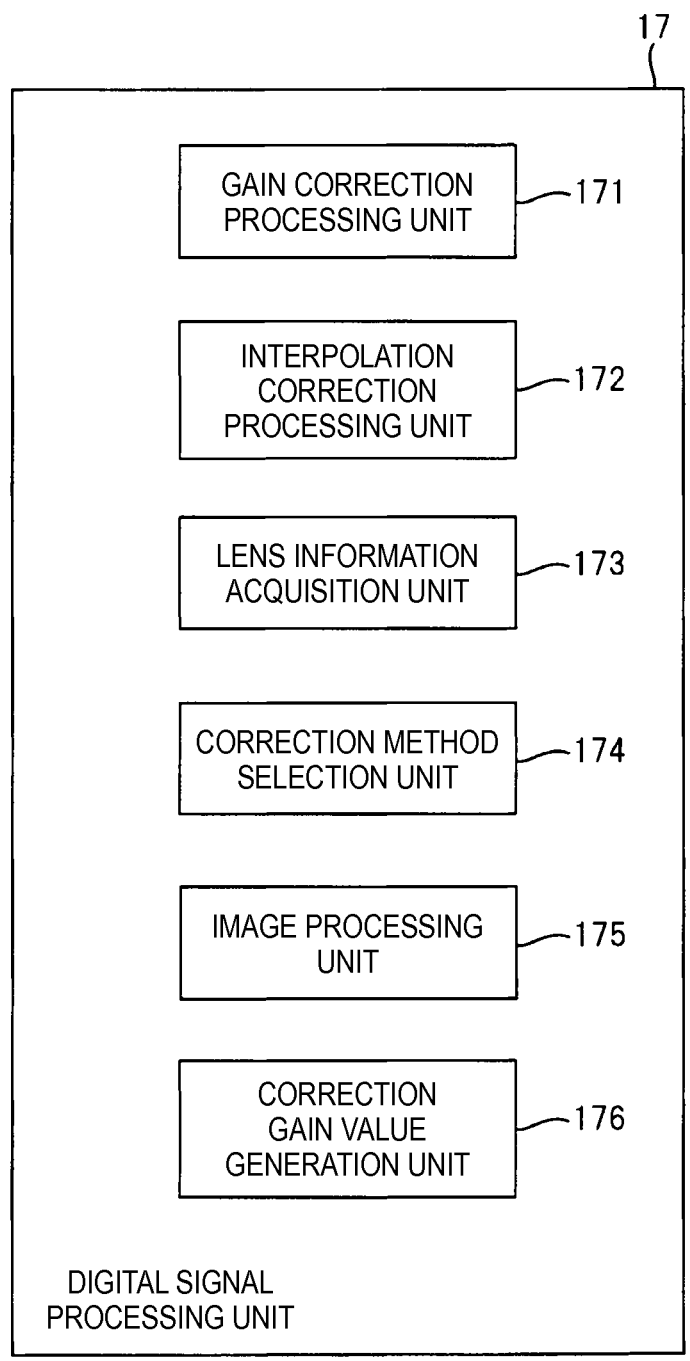
FIG. 5 is a diagram illustrating a modification example of a functional block diagram of the digital signal processing unit 17 in the digital camera that is illustrated in FIG. 1.

FIG. 5 is a functional block diagram illustrating a modification example of the digital signal processing unit 17 in the digital camera that is illustrated in FIG. 1. The digital signal processing unit 17 that is illustrated in FIG. 5 is the same as the one that is illustrated in FIG. 3, except for the fact that a correction gain value generation unit 176 is added.

In a case where information (hereinafter referred to as light beam angle information) relating to a light beam angle in the lens device 100 is included in the lens information, the correction gain value generation unit 176 generates the correction gain value for every pixel 51 for phase difference detection, using the light beam angle information and pieces of design information (pieces of information, such as a chip size, the number of pixels, a shape of an opening in the light shielding film on the pixel for phase difference direction, a shape of a photoelectric conversion area within a silicon substrate) on the solid-state imaging element 5. The correction gain value generation unit 176 stores the generated correction gain value in the main memory 16, in a state of being associated with the lens ID that is included in the lens information.

A method of generating the correction gain value using the light beam angle information and the design information on the solid-state imaging element 5 will be described.

Figure 6:
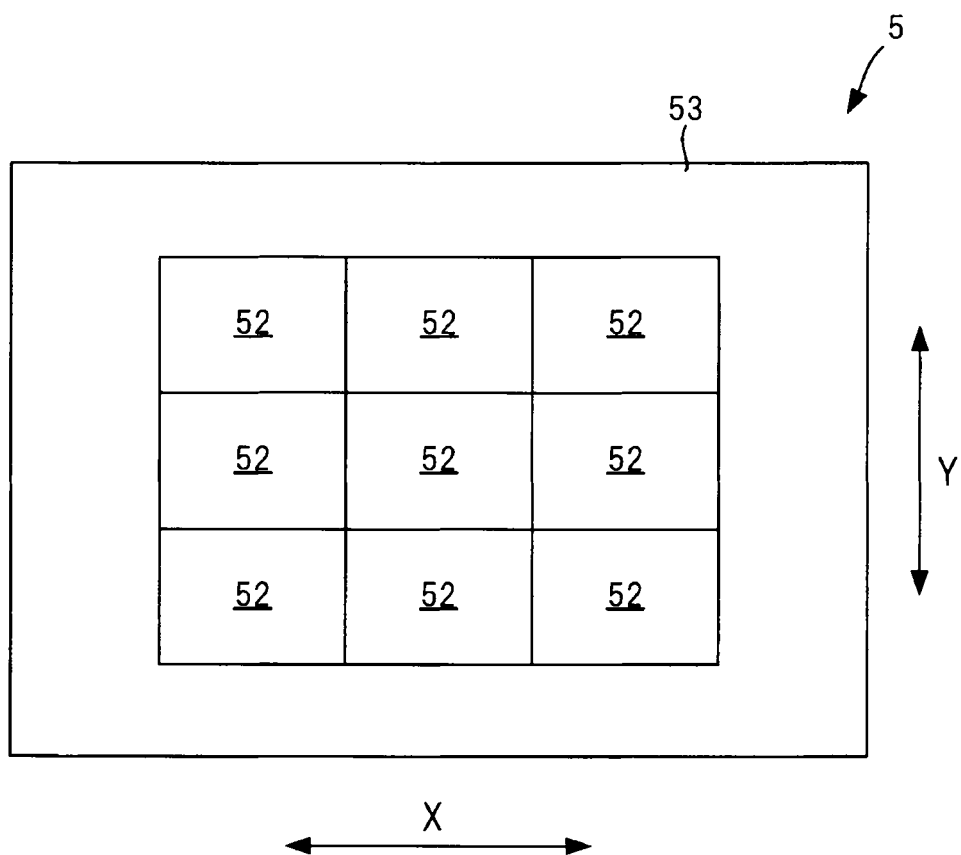
FIG. 6 is a schematic plane diagram of a configuration of the entire solid-state imaging element 5 that is mounted in the digital camera which is illustrated in FIG. 1.

FIG. 6 is a schematic plane diagram illustrating a configuration of the entire solid-state imaging element 5 that is mounted in the digital camera which is illustrated in FIG. 1.

The solid-state imaging element 5 has the light receiving surface 53 on which the pixels 51 are arranged. Then, in an example in FIG. 6, nine phase difference detection areas (AF areas) 52 that are phase difference detection targets are provided on the light receiving surface 53.

The AF area 52 is an area that includes multiple phase difference pairs that are arranged side by side in the row direction X. Only the pixels 51 for imaging are arranged in an area other than the AF area 52 in the light receiving surface 53.

Among the nine AF areas 52 that are illustrated in FIG. 6, each of the three AF areas 52 that are right in the middle in the row direction X is an area that has the width in the row direction X across a straight line that passes an intersection point between the light receiving surface 53 and an optical axis of the imaging lens 1 and extends in the column direction Y, when viewed from above. A position in the row direction X of the intersection point between the light receiving surface 53 and the optical axis of the imaging lens 1 is referred to as an axial position.

The amount-of-defocusing computation unit 19 that is illustrated in FIG. 1 computes the amount of phase difference that is the amount of relative deviation between two images that are formed by the pair of pencils of light, using a group of output signals that are read from the pixel 51L for phase difference detection and the pixel 51R for phase difference detection which are in one AF area 52 that is selected by a user operation and the like from among the nine AF areas 52. Then, based on the amount of phase difference, a focal point adjustment state of the photographing lens 1, which, here, is the amount of and a direction of deviation from the focusing state, that is, an amount of defocusing, is obtained.

Based on the amount of defocusing that is computed by the amount-of-defocusing computation unit 19, the system control unit 11 that is illustrated in FIG. 1 moves the focal lens that is included in the imaging lens 1 to a focusing position and thus controls a focusing state of the imaging lens 1.

The openings in the pixel 51R for phase difference detection and the pixel 51L for phase difference detection are decentered in the reverse direction. For this reason, even if positions are almost the same in the direction of decentering the openings (the direction of deviation between a pair of images); the row direction X in FIG. 2), a difference in sensitivity occurs between the pixel 51R for phase difference detection and the pixel 51L for phase difference detection.

Figure 7:
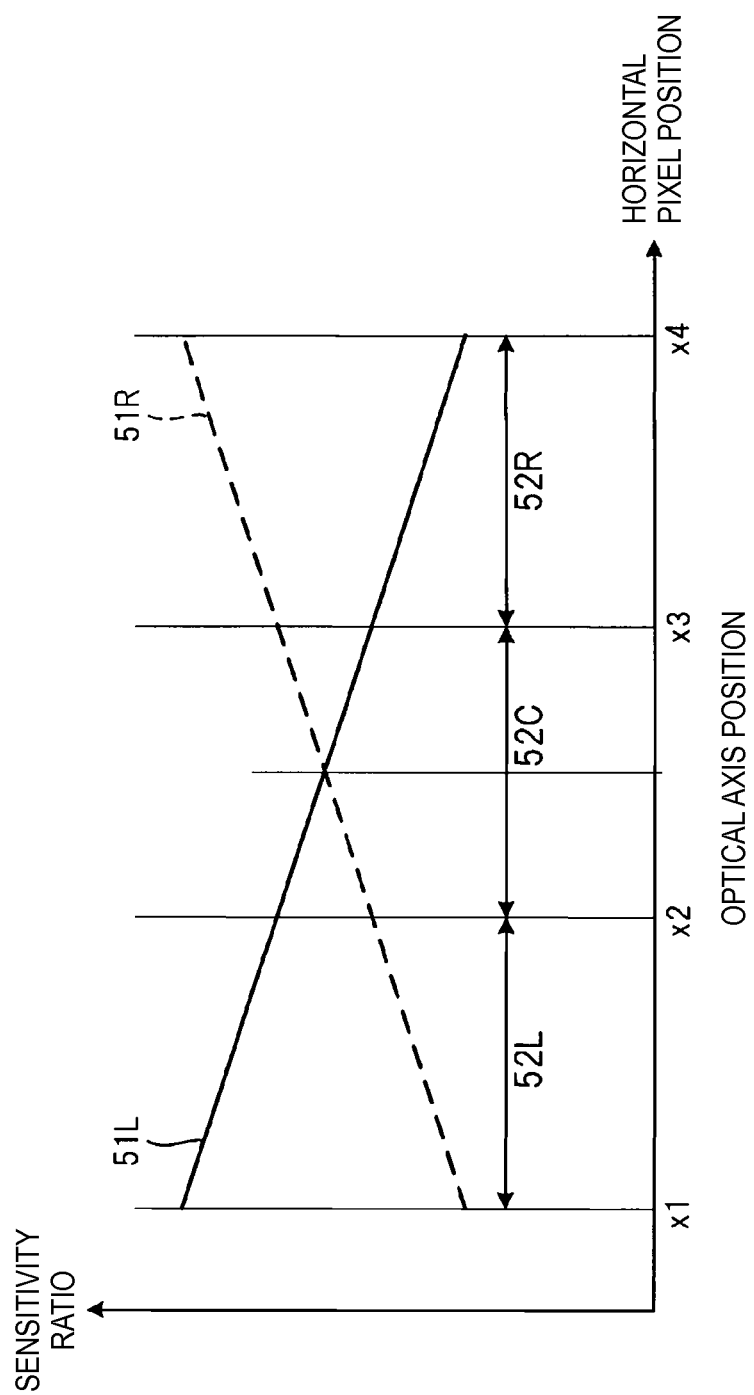
FIG. 7 is a diagram illustrating sensitivity ratios for pixels 51R and 51L for phase difference detection at a position (a horizontal pixel position) in the row direction X in the solid-state imaging element 5.

FIG. 7 is a diagram illustrating sensitivity ratios for the pixels 51R and 51L for phase difference detection that constitute the phase difference pair that is at an arbitrary position (hereinafter referred to as a horizontal pixel position) in the row direction X in the solid-state imaging element 5.

A straight line that is indicated by reference character 51R in FIG. 7 indicates the sensitivity ratio for the pixel 51R for phase difference detection, and a straight line that is indicated by reference character 51L indicates the sensitivity ratio of the pixel 51L for phase difference detection.

An arbitrary sensitivity ratio for the pixel for phase difference detection is referred to as a value that is expressed as A/B or B/A when an output signal of an arbitrary pixel for phase difference detection and an output signal of a pixel for imaging (only a pixel that detects the same light as the arbitrary pixel for phase difference detection) adjacent to the arbitrary pixel for phase difference detection are defined as A and B, respectively. FIG. 7 is a diagram that results when the sensitivity ratio is expressed as NB.

In FIG. 7, a range of horizontal pixel positions of three AF areas 52 that are in the left end portion of FIG. 6 is indicated by reference character 52L. Furthermore, a range of horizontal pixel positions of three AF areas 52 that are in the middle portion of FIG. 6 is indicated by reference character 52C. Furthermore, a range of horizontal pixel positions of three AF areas 52 that are in the right portion of FIG. 6 is indicated by reference character 52R.

In FIG. 7, a horizontal pixel position of a left end portion in a range 52L is indicated by x1, a horizontal pixel position of a right end portion in a range 52L is indicated by x2, a horizontal pixel position of a right end portion in a range 52C is indicated by x3, and a horizontal pixel position of a right end portion in a range 52R is indicated by x4.

The pixels 51R AND 51L for phase difference detection are arranged periodically in the column direction Y as well. However, because the openings of the pixel 51R for phase difference detection and the pixel 51L for phase difference detection are not decentered in the column direction Y as well, a sensitivity ratio at any position in the column direction Y is as illustrated in FIG. 7.

Because each of the output signals of the pixel 51R for phase difference detection and the pixel 51L for phase difference detection individually has a different level at every horizontal pixel position due to a photographic subject, what a sensitivity distribution of the pixel for phase difference detection will look like is not understood. However, as illustrated in FIG. 7, if the sensitivity ratio, which is a ratio between the output signals of the pixel for phase difference detection and the pixel of imaging adjacent to the pixel for phase difference detection, is obtained, the sensitivity distribution of the pixel for phase difference detection can be known.

Figure 8:
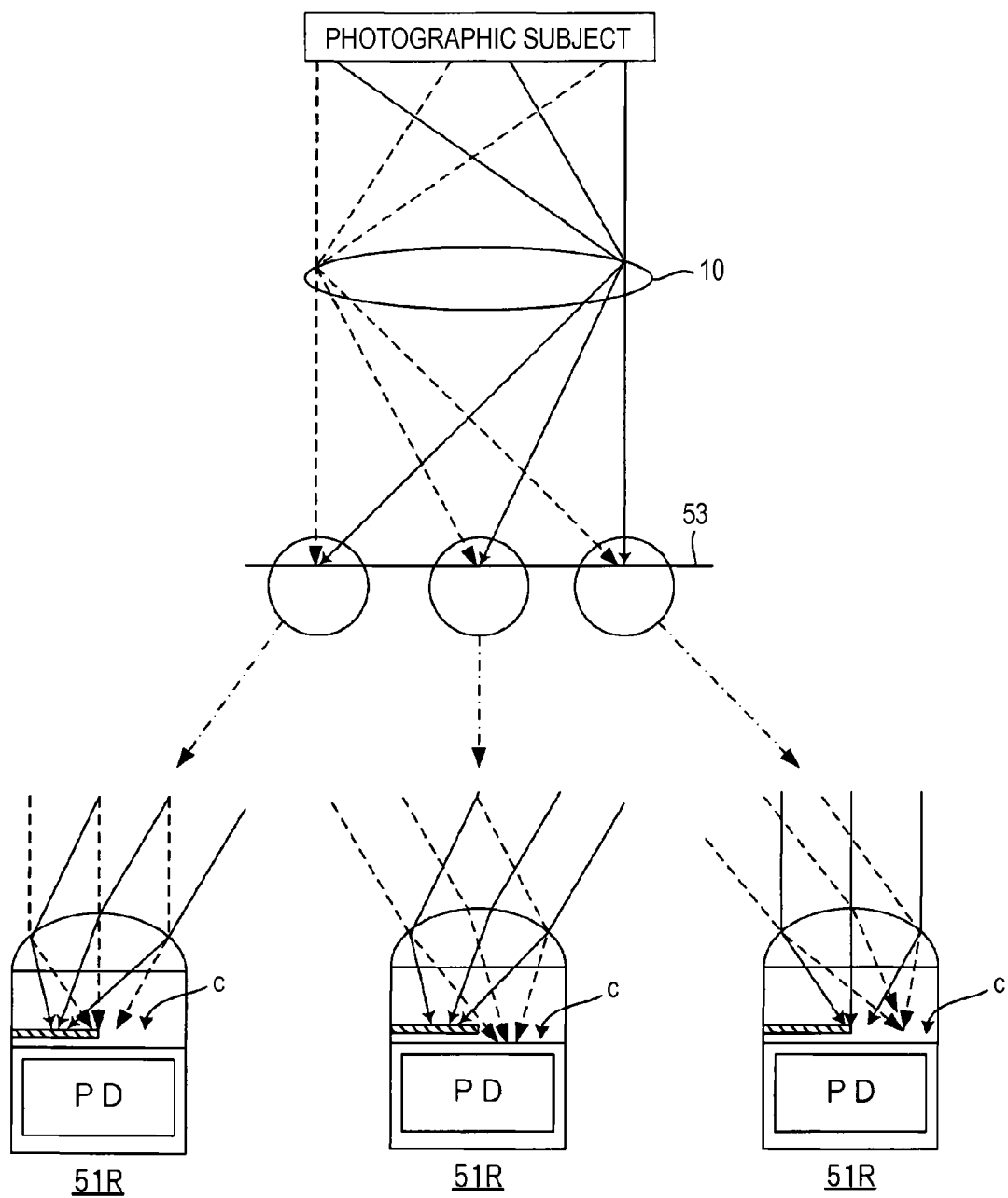
FIG. 8 is a diagram for describing how the sensitivity ratio in FIG. 7 is attained.

The opening c of the pixel 51R for phase difference detection is decentered to the right side in FIG. 2. For this reason, as illustrated in FIG. 8, half of a light that passes through the left side of the photographing lens 10 enters the opening c of the pixel 51R for phase difference detection that is on the left side of the light receiving surface 53, and a light that passes through the right side of the photographing lens 10 does not enter the opening c of the pixel 51R for phase difference detection. On the other hand, half of a light that passes through the right side of the photographing lens 10 enters the opening c of the pixel 51R for phase difference detection that is on the right side of the light receiving surface 53, and all lights that pass through the left side of the photographing lens 10 enter the opening c of the pixel 51R for phase difference detection. Furthermore, only a light that passes through the left side of the photographing lens 10 enters the opening c in the pixel 51R for phase difference detection that is on the middle side of the light receiving surface 53, and a light that passes through the right side of the photographing lens 10 does not enter the opening c in the pixel 51R for phase difference detection.

Furthermore, because the opening b of the pixel 51L for phase difference detection is decentered reversely in the row direction X with respect to the pixel 51R for phase difference detection, a characteristic of the sensitivity ratio for the pixel 51L for phase difference detection is the reverse of that of the pixel 51R for phase difference detection.

Therefore, as illustrated in FIG. 7, as we go from the left end portion of the light receiving surface 53 to the right end portion, the sensitivity ratio for the pixel 51L for phase difference detection is lower. Furthermore, we go from the left end portion of the light receiving surface 53 to the right end portion, the sensitivity ratio for the pixel 51R for phase difference detection is higher.

Moreover, because a component in the row direction X, of an incident light enters almost vertically the vicinity of the middle portion (a portion that overlaps a straight line which passes through a point that intersects the light receiving surface 53 and the optical axis of the photographing lens 10 and which extends in the column direction Y) in the row direction X, of the light receiving surface 53, the sensitivity ratio for the pixel 51L for phase difference detection and the sensitivity ratio for the pixel 51R for phase difference detection are almost the same.

In this manner, the solid-state imaging element 5 that is equipped with the pixel 51R for phase difference detection and the pixel 51L for phase difference detection has a characteristic of the sensitivity ratio as illustrated in FIG. 7.

The sensitivity ratio for each of the phase difference pairs in an arbitrary horizontal pixel position that is illustrated in FIG. 7 is uniquely determined by an angle of a light beam (hereinafter referred to as an incident light beam angle) that enters the horizontal pixel position. The incident light beam angle will be described below.

Figure 9:
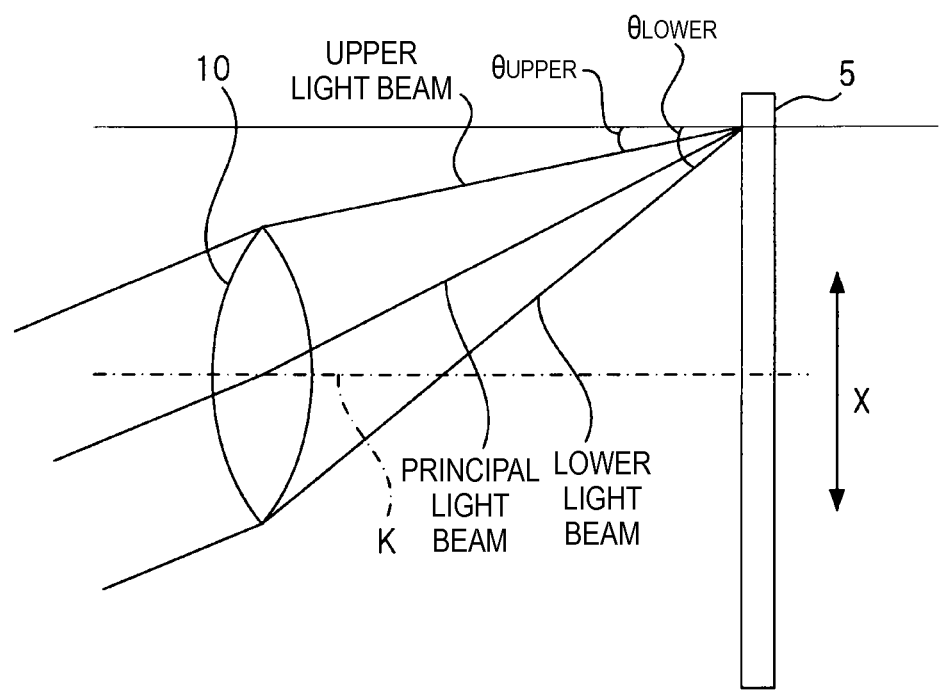
FIG. 9 is a diagram for describing an incident light beam angle in an arbitrary position in the row direction X, of the solid-state imaging element 5.

FIG. 9 is a diagram illustrating a state where the photographing lens 10 and the solid-state imaging element 5 face toward the column direction Y that is a direction which intersects the optical axis of the photographing lens 10 and the row direction X.

A light that enters an arbitrary horizontal pixel position in the solid-state imaging element 5 includes a principal light beam that passes through the center of the photographing lens 10, an upper light beam that passes through an upper end portion in FIG. 9, of the photographing lens 10, and a lower light beam that passes through a lower end portion in FIG. 9, of the photographing lens 10.

The upper light beam refers to a light beam that passes through one end portion (the upper end portion) in the row direction X, of the photographing lens 10 and reaches the arbitrary horizontal pixel position. The lower light beam refers to a light beam that passes through the other end portion (the lower end portion) in the row direction X, of the photographing lens 10, and that reaches the arbitrary horizontal pixel position.

As illustrated in FIG. 9, an angle (an upper light beam angle) that the upper light beam makes with respect to an optical axis K of the photographing lens 10 is defined as $\theta_{upper}$, an angle (a lower light beam angle) that the lower light beam makes with the optical axis K of the photographing lens 10 is defined as $\theta_{lower}$, and an incident light beam angle in an arbitrary horizontal pixel position in the solid-state imaging element 5 is defined as a combination of the upper light beam angle θ and the lower light beam angle $\theta_{lower}$.

Even if the horizontal pixel positions are the same, when optical conditions (for example, a combination of an F value, a focal point distance, and a focal lens) changes, the incident light beam angle in the horizontal pixel position also changes.

Each of the sensitivity ratio for the pixel 51R for phase difference detection and the sensitivity ratio for the pixel 51L for phase difference detection has a linear characteristic as illustrated in FIG. 7. For this reason, if the sensitivity ratio for the pixel 51R for phase difference detection and the sensitivity ratio for the pixel 51L for phase difference detection in at least two positions in the row direction X, in the solid-state imaging element 5, are understood, the sensitivity ratio for the pixel 51R for phase difference detection and the sensitivity ratio for the pixel 51L for phase difference detection in all positions in the row direction X can be obtained with linear interpolation.

The sensitivity ratio for each of the phase difference pairs that is present in an arbitrary horizontal pixel position is determined by the incident light beam angle in the horizontal pixel position. Furthermore, the incident light beam angle in an arbitrary horizontal pixel position differs with a type of the lens device 100 or an optical condition that is set to be in the lens device 100.

Accordingly, according to the present embodiment, in a case where the lens device 100 is mounted on the camera main body 200, information on the incident light beam angle in at least two arbitrary positions in the row direction X, in the solid-state imaging element 5 is obtained for every optical condition of the lens device 100, and then is stored in the memory 3 of the lens device 100.

Furthermore, a table in which the sensitivity ratio of each of the phase difference pairs that are present in an arbitrary horizontal pixel position is associated with every incident light beam angle that differs with the arbitrary horizontal position is stored in the memory 16 of the camera main body 200. Moreover, when a combination of the lens device and the imaging element differs, the sensitivity ratio also differs. For this reason, it is desirable that data on the sensitivity ratio with respect to the incident light beam angle is stored in a device in which an imaging element is mounted, and because the information on the incident light beam angle is determined by a lens, it is desirable that the information on the incident light beam angle is stored in the lens device.

The information on the incident light beam angle that is stored in the memory 60, and the data in the table that is stored in the main memory 16 can be obtained with actual measurement during an adjustment process before shipment of the lens device 100 or the camera main body 200.

For example, the incident light beam angle in each of the horizontal pixel positions x1, x2, x3, and x4 that are illustrated in FIG. 7 is measured for all optical conditions (1, 2, 3, . . . ) that can be set in the lens device 100, a table as illustrated in FIG. 10 is created from a result of the measurement, and the created table is stored in the memory 60 of the lens device 100.

Furthermore, for all combinations in which the upper light beam angle and the lower light beam angle are considered, a sensitivity ratio for an arbitrary pixel 51R for phase difference detection and a sensitivity ratio for an arbitrary pixel 51L for phase difference detection that are the same in the horizontal pixel position are measured, a table as illustrated in FIG. 11 is created from a result of the measurement, and the created table is stored in the memory 16 of the camera main body 200. In FIG. 11, the sensitivity ratios for the pixel 51R for phase difference detection are indicated by R1, R2, and R3, and the sensitivity ratios for the pixel 51L for phase difference detection are indicated by L1, L2, and L3.

The light beam angle information that is stored in the memory 60 of the lens device 100 and the table that is stored in the main memory 16 are compared, and thus information on a sensitivity ratio for each pixel 51 for phase difference detection can be known for every imaging condition. In order for the sensitivity ratio to be set to 1, a value by which the output signal of the pixel 51 for phase difference detection has to be multiplied can be obtained as a correction gain value. In this manner, the correction gain value generation unit 176 generates the correction gain value for every pixel 51 for phase difference detection, using the light beam angle information that is stored in the memory 60 of the lens device 100 and the table that is stored in the main memory 16.

Moreover, as the table that is illustrated in FIG. 11, the correction gain value for setting the sensitivity ratio to "1" may be stored instead of the sensitivity ratio.

Figure 12:
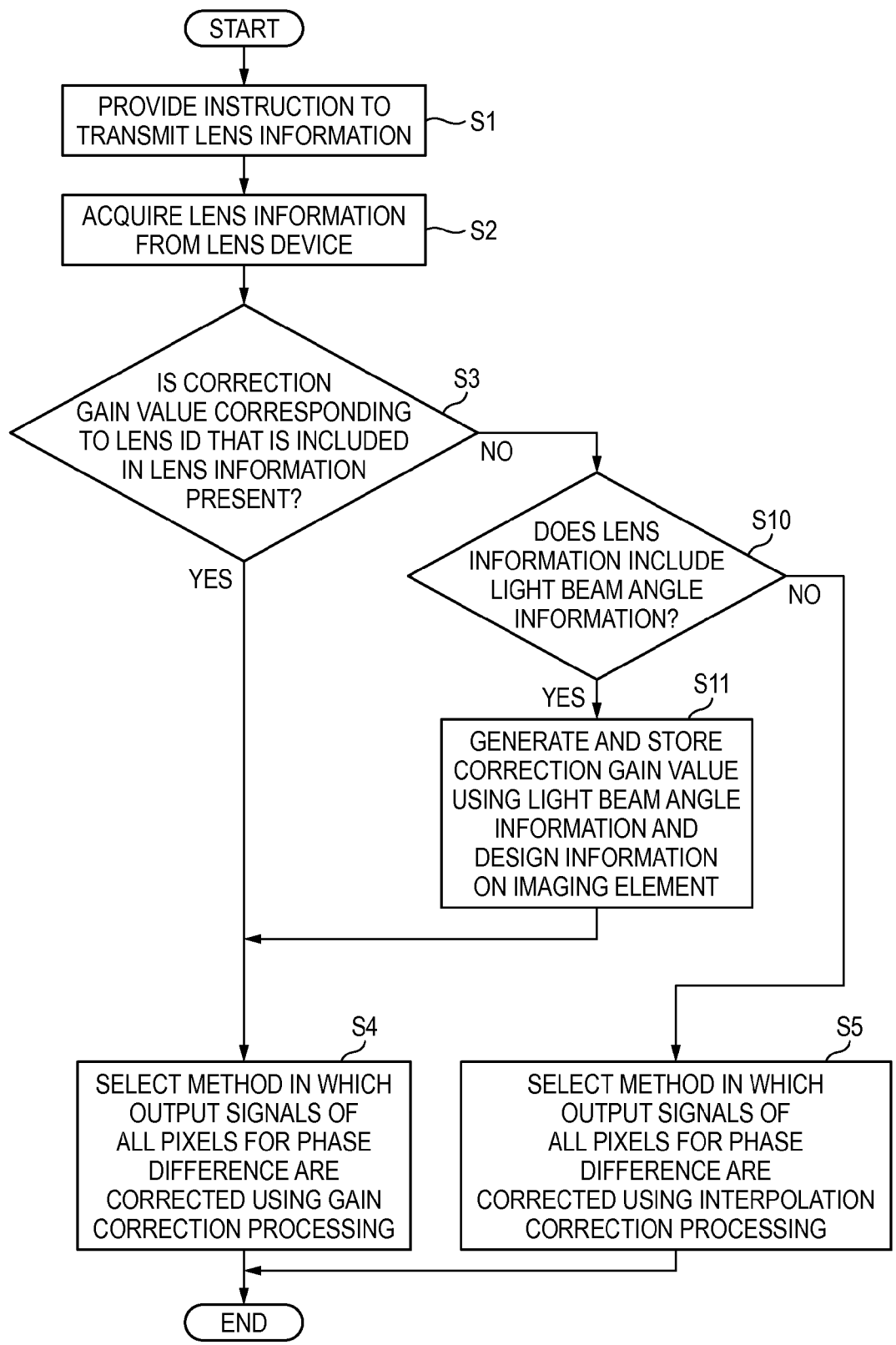
FIG. 12 is a flowchart for describing operation of a digital signal processing unit 17 that is illustrated in FIG. 5.

FIG. 12 is a flowchart for describing operation of the digital signal processing unit 17 that is illustrated in FIG. 5. The flowchart that is illustrated in FIG. 12 results from adding Step S10 and Step S11 to the flowchart that is illustrated in FIG. 4. In FIG. 12, the same processing operations as those in FIG. 4 are given the same reference numerals and descriptions thereof are omitted.

When a result of the determination in Step S3 is No, the correction gain value generation unit 176 determines whether or not the light beam angle information is included in the lens information (Step S10). In a case where the light beam angle information is not included in the lens information, processing in Step S5 is performed by the correction method selection unit 174.

In a case where the light beam angle information is not included in the lens information, the correction gain value generation unit 176 generates the correction gain value that corresponds to each pixel 51 for phase difference detection, for every imaging condition, using the light beam angle information and the table that is illustrated in FIG. 11, and stores a group of generated correction gain value in the main memory 16, in a state of being associated with the lens ID that is included in the lens information (Step S11). The group of the correction gain value may be stored in the memory 60 of the lens device 100, in a state of being associated with the lens ID.

Subsequent to Step S11, processing in Step S4 is performed by the correction method selection unit 174.

As described above, according to the digital camera in the modification example, even in a case where the correction gain value that corresponds to the lens ID is not stored in the camera main body 200 or the lens device 100, if the light beam angle information is included in the lens information, the correction gain value can be generated from the beam angle information, and then the generated correction gain value can be stored. For this reason, there is no need to store in advance the correction gain value for every imaging condition in the camera main body 200. Thus, the cost of manufacturing the digital camera can be reduced.

Furthermore, according to the digital camera in the modification example, because the generated correction gain value is stored in a state of being associated with the lens ID, in the lens device 100 in which the correction gain value is generated one time, the generation of the correction gain value can be omitted thereafter. Thus, a reduction in photographing time can be achieved.

Furthermore, in a case where the correction gain value is not stored in any of camera main body 200 and the lens device 100, and the lens device 100 in which the light beam angle information is not stored is mounted, correction of the output signal of the pixel 51 for phase difference detection is performed with interpolation correction processing. For this reason, in all the lens devices 100, imaging-obtained image quality can be made to be high or the like.

Moreover, in Step 4 in FIGS. 4 and 12, the second correction method in which the output signals of all the pixels 51 for phase difference detection are corrected with the gain correction processing is set to be selected. However, instead of the second correction method, a third correction method in which the output signal of each pixel for phase difference detection in the imaging-obtained image signal is corrected by any of the interpolation correction processing unit 172 and the gain correction processing unit 171 may be set to be selected.

There exist scenes for which the interpolation correction processing and the gain correction processing are excellent, respectively. For example, in a case where the output signal of the pixel for phase difference detection reaches a saturation level (blown-out highlight) or has an excessively low value (blocked-up shadow), when the interpolation correction processing is performed, high correction precision is achieved.

For this reason, for every pixel 51 for phase difference detection, it is determined which of the interpolation correction processing and the gain correction processing achieves higher correction precision, and the processing that achieves higher correction precision is set to be performed. Thus, the imaging-obtained image quality can be improved.

For example, as the third correction method, a method is employed in which, as disclosed in JP-A-2012-4729, an edge of an image of a photographic subject is detected and image data is corrected by switching between the interpolation correction processing and the gain correction processing according to the amount of edge. The third correction method is not limited to this, and a method of using the interpolation correction processing and the gain correction processing together may be employed.

So far, a way of selecting the correction method according to the lens information that is stored in the lens device 100 in a lens-interchangeable digital camera has been described.

In addition to this, in the lens-interchangeable digital camera, a way of always performing the interpolation correction processing may be set to be employed without performing the gain correction processing. In this case, it is also possible to support all lens devices. Furthermore, a job of generating a correction gain value is unnecessary.

Furthermore, so far, a description has been provided on the assumption that the camera main body 200 can acquire the lens information from the lens device 100. However, in some cases, communication cannot be performed between the lens device 100 and the camera main body 200. For example, in some cases, a genuine mount adapter that is manufactured by the maker of the camera main body 200 in compliance with specifications of lens that is manufactured by another maker is mounted on the camera main body 200, and a lens that is manufactured by another maker is mounted on the genuine mount adapter.

In such a case, when detecting that the genuine mount adapter is mounted on the electric contact point 9, the system control unit 11 of the camera main body 200 makes it possible to activate a lensless release mode in which photographing is possible without a lens device. The lensless release mode may be manually set in such a manner that the lensless release mode can be activated or inactivated. When the lensless release mode is set to be employed, it is possible to manually input information such as a focal point distance of a lens.

In this manner, the activation of the lensless release mode leads to a state where the lens information cannot be acquired from the lens device 100 that is mounted on the camera main body 200. For this reason, in a case where it is determined that the lens information cannot be acquired, the system control unit 11 always performs the interpolation correction processing without performing the gain correction processing. By doing this, even in a case where the lens device that cannot perform communication is mounted, the correction of the output signal of the pixel for phase difference detection can be performed.

Next, a configuration of a smartphone as an imaging device is described.

Figure 13:
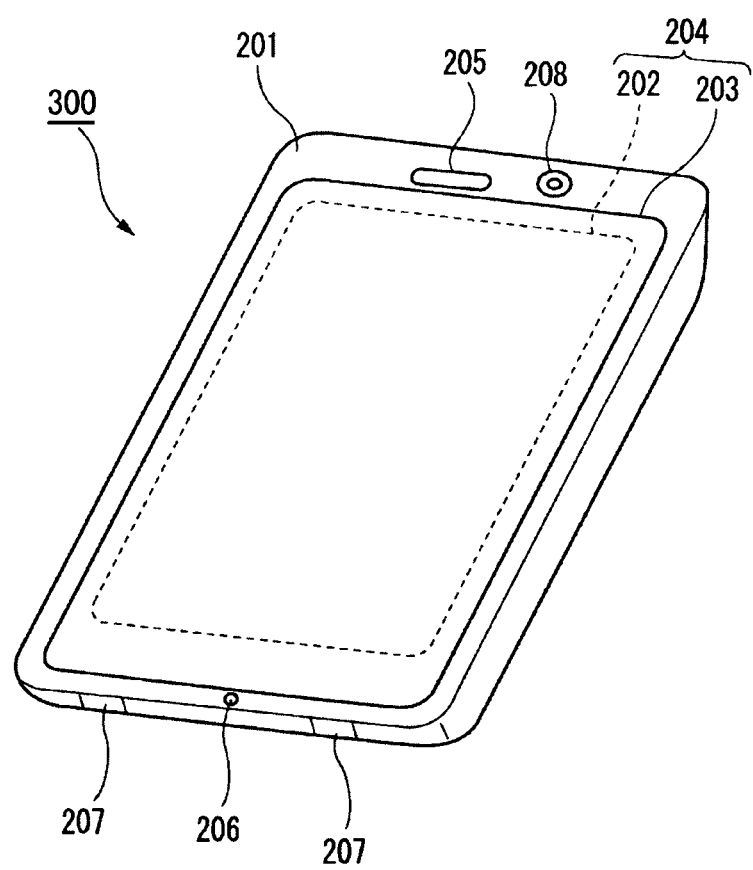
FIG. 13 is a diagram for describing a smartphone as an imaging device.

FIG. 13 illustrates an external appearance of smartphone 300 according to one embodiment of the present invention. The smartphone 300 that is illustrated in FIG. 13 has a flat plate-shaped case 201, and includes a display input unit 204 into which a display panel 202 as a display unit on one surface of the case 201 and an operation panel 203 as an input unit are integrally combined. Furthermore, such a case 201 includes a speaker 205, a microphone 206, an operation unit 207, and a camera unit 208. Moreover, a configuration of the case 201 is not limited to this. For example, a configuration can be employed in which a display unit and an input unit are independent of each other. A configuration can be employed in which a foldable structure or a slidable structure is available.

Figure 14:
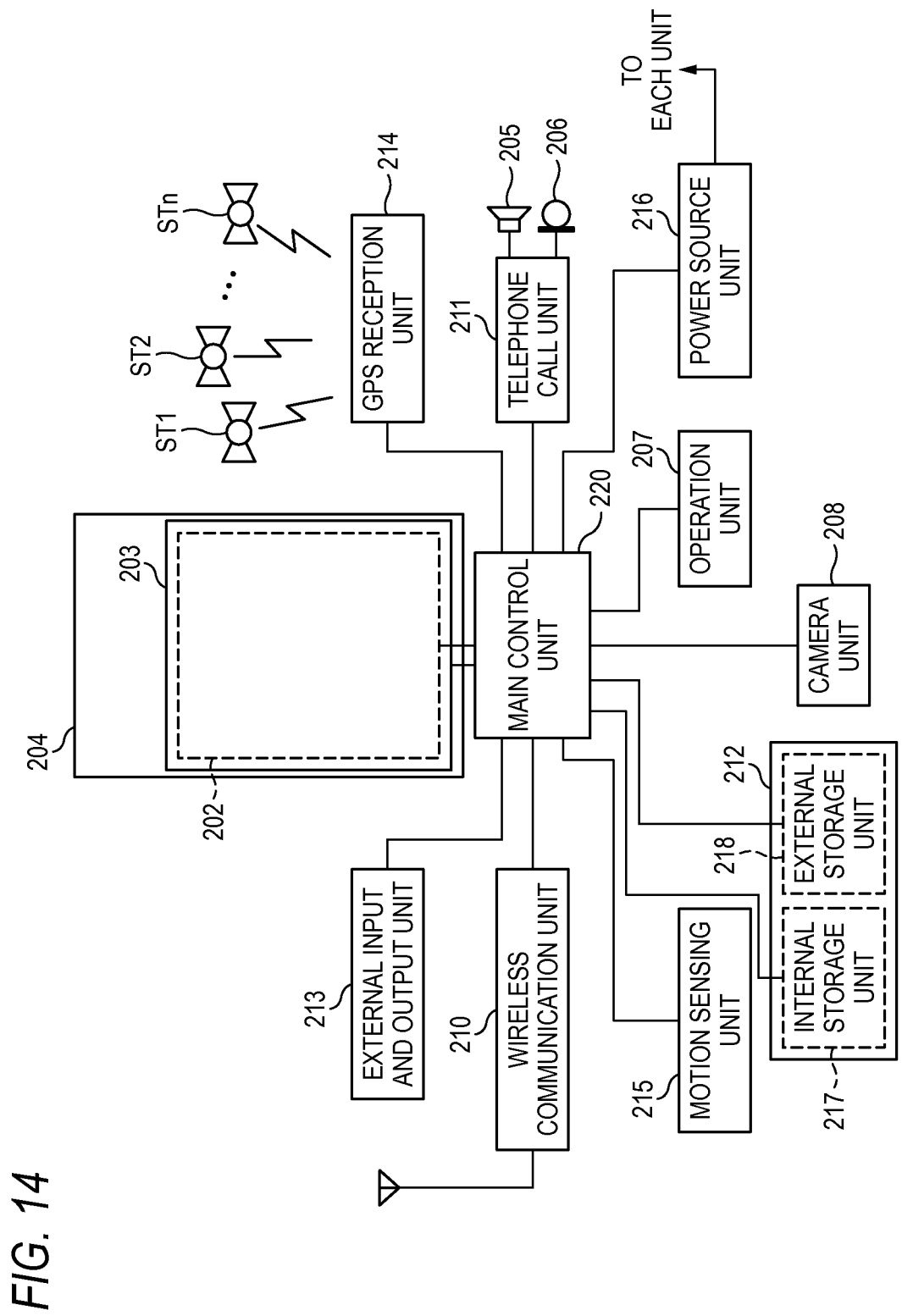
FIG. 14 is a block diagram of the inside of the smartphone in FIG. 13.

FIG. 14 is a block diagram illustrating a configuration of the smartphone 300 that is illustrated in FIG. 13. As illustrated in FIG. 13, a wireless communication unit 210, the display input unit 204, a telephone call unit 211, the operation unit 207, the camera unit 208, a storage unit 212, an external input and output unit 213, a global positioning system (GPS) reception unit 214, a motion sensing unit 215, a power source unit 216 and a main control unit 220 are included as main constituent elements of the smartphone. Furthermore, a wireless communication function, in which a mobile wireless communication is performed through a base station device BS whose illustration is omitted and a mobile communication network NW, of which an illustration is omitted, provided as a main function of the smartphone 300.

According to an instruction of the main control unit 220, the wireless communication unit 210 performs wireless communication with the base station device BS that is accommodated in the mobile communication network NW. Using this wireless communication, transmission and reception of various pieces of file data, such as voice data and image data, electronic mail data, and the like, or transmission and reception of Web data, streaming data, and the like is performed.

The display input unit 204 is a so-called touch panel on which an image (a static image or a moving image) or text information, or the like is displayed under the control of the main control unit 220 in order to transfer visually information to a user, and includes the display panel 202 and the operation panel 203.

For the display panel 202, a liquid crystal display (LCD), an organic electro-luminescence display (OELD), or the like is used as a display device.

The operation panel 203 is a device on which an image displayed on a display surface of the display panel 202 is arranged in place in a visually recognizable manner, and which detects one set of coordinates or multiple sets of coordinates that result from an operation that is performed with a user's finger or a stylus. When the device is operated with the user' finger or the stylus, a detection signal that occurs due to the operation is output to the main control unit 220. Subsequently, based on the received detection signal, the main control unit 220 detects an operation position (coordinates) on the display panel 202.

As illustrated in FIG. 13, the display panel 202 of and the operation panel 203 of the smartphone 300 that is illustrated as a photographing device according to one embodiment of the present invention are integrated into one piece and thus constitutes the display input unit 204, and the operation panel 203 is arranged in such a manner as to cover the display panel 202 completely.

In a case where this arrangement is employed, the operation panel 203 may have a function of detecting a user operation on areas other than the display panel 202 as well. In other words, the operation panel 203 may include a detection area (hereinafter referred to as a display area) for a superimposition part that overlaps the display panel 202, and a detection area (hereinafter referred to as a non-display area) for a part other than the superimposition part, that is, an edge part that does not overlap the display panel 202.

Moreover, a size of the display area and a size of the display panel 202 may be completely consistent with each other, but both of the sizes are not necessarily consistent with each other. Furthermore, the operation panel 203 may include two responsive areas, that is, the edge part and an inner part other than the edge part. Still more, the width of the edge part is suitably designed according to the size of the case 201 and the like. Still more, as examples of a position detection type that is employed for the operation panel 203, there are a matrix switch type, a resistive film type, a surface acoustic wave type, an infrared type, an electromagnetic induction type, an electrostatic capacitance type, and the like, and any of them can be employed.

The telephone call unit 211 includes the speaker 205 or the microphone 206. The telephone call unit 211 converts a user voice that is input through the microphone 206 into voice data that can be processed in the main control unit 220, and then output the resulting voice data to the main control unit 220, or decodes voice data that is received by the wireless communication unit 210 or the external input and output unit 213, and then causes the resulting voice data to be output from the speaker 205. Furthermore, as illustrated in FIG. 13, for example, the speaker 205 can be mounted on the same surface as the surface on which the display input unit 204 is provided, and the microphone 206 can be mounted on a lateral face of the case 201.

The operation unit 207 is a hardware key that is a key switch or the like, and receives an instruction from the user. For example, as illustrated in FIG. 13, the operation unit 207 is a push-button type switch that is mounted on a lateral face of the case 201 of the smartphone 300. The push-button type, when pushed down with a finger and the like, is in an ON state, and, when the finger is released, is in an OFF state due to restoring force of a spring or the like.

Control program or control data for the main control unit 220, application software, address data with which a name of or a telephone number of a communication partner or the like is associated, electronic mail data that is transmitted and received, Web data that is downloaded by a Web browsing, or content data that is downloaded is stored in the storage unit 212. Furthermore, streaming data or the like is temporarily stored in the storage unit 212. Furthermore, the storage unit 212 is configured from an internal storage unit 217 that is built into the smartphone and an external storage unit 218 that has a memory slot that can be detachably attached. Moreover, each of the internal storage unit 217 and the external storage unit 218 that constitute the storage unit 212 is realized as a storage medium, such as a flash memory type, a hard disk type, a multimedia card micro type, a card type memory (for example, MicroSD (a registered trademark) memory, or the like), a random access memory (RAM), or a read only memory (ROM).

The external input and output unit 213 is connected to the smartphone 300, and plays a role of an interface with all external devices. The external input and output unit 213 is directly or indirectly connected with other external devices through communication (for example, a universal serial bus (BUS), IEEE 1394, or the like) or the like, or through a network (for example, the Internet, a wireless LAN, Bluetooth (a registered trademark), radio frequency identification (RFID), Infrared Data Association: IrDa (a registered trademark), Ultra Wideband (UWB) (a registered trademark), ZigBee (a registered trademark) or the like).

As the external devices that are connected to the smartphone 300, for example, there are a wire/wireless headset, a wire/wireless external battery charger, a wire/wireless data port, a memory card or Subscriber Identity Module Card (SIM)/User Identity Module (UIM) card that is connected through a card socket, an external audio • video device that is connected through an audio • video input/output (I/O) terminal, an external audio • video device that is connected in a wireless manner, a smartphone that is connected in a wire/wireless manner, a personal computer that is connected in a wire/wireless manner, a PDA that is connected in a wire/wireless manner, a personal computer that is connected in a wire/wireless manner, and an earphone. Through the external input and output unit 213, data that is transferred from these external devices can be transferred to each constituent element within the smartphone 300, or data within the smartphone 300 can be transferred to the external devices.

According to an instruction from the main control unit 220, the GPS reception unit 214 receives a GPS signal that is transmitted from GPS satellites ST1 to STn, performs positioning computing-operation processing that is based on multiple GPS signals that are received, and detects a position that is configured from a latitude, a longitude, and an altitude of the smartphone 300. When positional information can be acquired from the wireless communication unit 210 or the external input and output unit 213 (for example, a wireless LAN), the GPS reception unit 214 can detect a position using the positional information.

The motion sensing unit 215, for example, includes a triaxial acceleration sensor and the like, and detects a physical movement of the smartphone 300 according to an instruction of the main control unit 220. A direction of the movement of the smartphone 300 or acceleration of the smartphone 300 is detected by detecting the physical movement of the smartphone 300. A result of the detection is output to the main control unit 220.

According to an instruction of the main control unit 220, the power source unit 216 supplies electric energy that is stored in a battery (not illustrated) to each unit of the smartphone 300.

The main control unit 220 includes a microprocessor, operates according to a control program or control data that is stored in the storage unit 212, and integrally controls each unit of the smartphone 300. Furthermore, in order to perform voice communication or data communication through the wireless communication unit 210, the main control unit 220 has a mobile communication control function of controlling each unit of a communication system and an application processing function.

The application processing function is realized by the main control unit 220 operating according to application software that is stored in the storage unit 212. As the application processing functions, for example, there are an infra communication function of controlling the external input and output unit 213 to perform data communication with a device that faces the smartphone 300, an electronic mail function of performing transmission and reception of an electronic mail, and a Web browsing function of browsing through Web pages.

Furthermore, the main control unit 220 has an image processing function of displaying an image on the display input unit 204 based on image data (a static image or a moving image) such as received data or streaming data that is downloaded and of doing a job like this. The image processing function refers to a function in which the main control unit 220 decodes the image data, performs image processing on a result of the decoding, and displays an image on the display input unit 204.

Still more, the main control unit 220 performs display control of the display panel 202, and operation detection control that detects a user operation that is performed through the operation unit 207 and the operation panel 203. By performing the display control, the main control unit 220 displays an icon for activating application software, or a software key such as a scroll bar, or displays a window for creating an electronic mail. Moreover, the scroll bar refers to a software key for receiving an instruction to move a displayed part of the image or the like that is too large to fit into a display area of the display panel 202.

Furthermore, by performing the operation detection control, the main control unit 220 detects the user operation that is performed through the operation unit 207, enables an operation to be applied to the icon through the operation panel 203, enables a string of letters to be input into an input box on the window through the operation panel 203, or receives a request to scroll through a displayed image, which is made through a scroll bar.

Still more, by performing the operation detection control, the main control unit 220 determines whether a position of an operation that is applied to the operation panel 203 is a superimposition part (a display area) that overlaps the display panel 202 or is a part other than the superimposition part, that is, an edge part (a non-display area) that does not overlap the display panel 202, and includes a touch panel control function of controlling a responsive area of the operation panel 203 or a display position of a software key.

Furthermore, the main control unit 220 can detect a gesture operation that is applied to the operation panel 203 is detected, and can perform a function that is set in advance according to the detected gesture operation. The gesture operation means an operation that draws a track with a finger and the like, designates multiple positions at the same time, or draws at least one track from the multiple positions by combining these actions, not a simple touch operation in the related art.

The camera unit 208 is configured from components other than the external memory control unit 20, the recording medium 21, the display control unit 22, the display unit 23, and the operation unit 14 in the digital camera that is illustrated in FIG. 1. The imaging-obtained image data that is generated by the camera unit 208 can be recorded in the storage unit 212, or can be output through the input and output unit 213 or the wireless communication unit 210. As illustrated in FIG. 13, in the smartphone 300, the camera unit 208 is mounted on the same surface as the display input unit 204. However, the position on which the camera unit 208 is mounted is not limited to this, and the camera unit 208 may be mounted on a rear surface of the display input unit 204.

Furthermore, the camera unit 208 can be used for each function of the smartphone 300. For example, an image that is acquired in the camera unit 208 can be displayed on the display panel 202, or an image that is acquired in the camera unit 208 can be used with one operation input that is applied to the operation panel 203. Furthermore, when the GPS reception unit 214 detects a position, the position can be detected by referring to an image from the camera unit 208. Still more, referring to the image from the camera unit 208, the optical axis direction of the camera unit 208 of the smartphone 300 can be determined or a current usage environment can be determined without using the triaxial acceleration sensor, or using the triaxial acceleration sensor together. Of course, the image from the camera unit 208 can be used within application software.

In addition, positional information that is acquired by the GPS reception unit 214, voice information (which may be text information that results from the main control device and the like performing voice-to-text conversion) that is acquired by the microphone 206, gesture information that is acquired by the motion sensing unit 215, and the like can be recorded in a recording unit 212, in a state of being added to image data on a static image or a moving image, and can be output through the input and output unit 213 or the wireless communication unit 210.

In the smartphone 300 as illustrated above, the solid-state imaging element 5 is used as an imaging element of the camera unit 208, and thus high-precision phase difference AF and high-quality photographing are possible.

A program for causing a computer to perform a functional block of the digital signal processing unit 17 is deliverable through a network such as the Internet, and thus the program is installed on the smartphone and the like that is equipped with a camera. As a result, the same function as performed by the digital camera that is illustrated in FIG. 1 can be realized. Furthermore, the program can be provided in a state of being recorded on a non-temporary computer-readable medium.

As described above, the following matters are disclosed in the present specification.

The disclosed imaging apparatus is an imaging device to which a lens device is capable of being detachably mounted, comprising: an imaging element that includes multiple pixels for imaging arranged into a two-dimensional array and multiple pixels for phase difference detection on a light receiving surface and that images a photographic subject through the lens device; a communication unit for performing communication with the mounted lens device; a lens information acquisition unit that acquires lens information that is information specific to the lens device, from the lens device through the communication unit; a gain correction processing unit that performs gain correction processing which corrects an output signal of the pixel for phase difference detection in an imaging-obtained image signal that is obtained by the imaging element imaging the photographic subject, by multiplying the output signal by a gain value; an interpolation correction processing unit that performs interpolation correction processing which corrects the output signal of the pixel for phase difference detection in the imaging-obtained image signal by replacing the output signal with a signal that is generated using an output signal of the pixel for imaging that is in the vicinity of the pixel for phase difference detection and that detects the same color as the pixel for phase difference detection; a correction method selection unit that selects according to the lens information that is acquired by the lens information acquisition unit, any of a first correction method in which the output signals of all the pixels for phase difference detection in the imaging-obtained image signal are corrected by the interpolation correction processing unit, a second correction method in which the output signals of all the pixels for phase difference detection in the imaging-obtained image signal are corrected by the gain correction processing unit, and a third correction method in which the output signal of each pixel for phase difference detection in the imaging-obtained image signal is corrected by any of the interpolation correction processing unit and the gain correction processing unit; and an image processing unit that corrects the output signal of the pixel for phase difference detection in the imaging-obtained image signal, using the method that is selected by the correction method selection unit.

In the disclosed imaging apparatus, in a case where the gain value that corresponds to identification information for identifying the lens device, which is included in the lens information, is not stored in any of the imaging device and the lens device, the correction method selection unit selects the first correction method.

In the disclosed imaging apparatus, in a case where information necessary for generating the gain value that is determined by combining the mounted lens device and the imaging element is not included in the lens information, the correction method selection unit selects the first correction method.

In the disclosed imaging apparatus, the information necessary for acquiring the gain value is light beam angle information of the lens device.

The disclosed imaging apparatus further comprises: a correction gain value generation unit that generates the gain value using the information relating to the light beam angle and information relating to sensitivity of the imaging element for every light beam angle, in a case where the information relating to the light beam angle is included in the lens information.

The disclosed signal processing method is signal processing method for use in an imaging device to which a lens device is capable of being detachably mounted, the imaging device including an imaging element that includes multiple pixels for imaging arranged into a two-dimensional array and multiple pixels for phase difference detection on a light receiving surface and that images a photographic subject through the lens device, and a communication unit for performing communication with the mounted lens device, the signal processing method comprising: a lens information acquisition step of acquiring lens information that is information specific to the lens device, from the lens device through the communication unit; a correction method selection step of selecting according to the lens information that is acquired by the lens information acquisition step, any of a first correction method in which the output signals of all the pixels for phase difference detection in the imaging-obtained image signal are corrected by interpolation correction processing that replaces the output signals with signals that are generated using an output signal of the pixel for imaging that is in the vicinity of the pixel for phase difference detection and that detects the same color as the pixel for phase difference detection, a second correction method in which the output signals of all the pixels for phase difference detection in the imaging-obtained image signal are corrected by the gain correction processing that corrects the output signals by multiplying the output signals by a gain value, and a third correction method in which the output signal of each pixel for phase difference detection in the imaging-obtained image signal is corrected by any of the interpolation correction processing and the gain correction processing; and an image processing step of correcting the output signal of the pixel for phase difference detection in the imaging-obtained image signal, using the method that is selected in the correction method selection step.

The disclosed signal processing program is a program for causing a computer to perform each step of the signal processing method according to claim 6.

INDUSTRIAL APPLICABILITY

The present invention applies particularly to a digital camera and the like, and thus great convenience and high effectiveness are achieved.

The specific embodiments of the present invention are described above, but the present invention is not limited to the embodiments described above. Various amendments are possible within the scope that does not depart from the disclosed technological idea behind the present invention.

The present application claims the benefit of earlier filing date and right of priority to Japanese Application No. 2013-50238, filed on Mar. 13, 2013, the contents of which are incorporated by reference herein in its entirety.

REFERENCE SIGNS LIST

100 LENS DEVICE
200 CAMERA MAIN BODY
5 SOLID-STATE IMAGING DEVICE
9 ELECTRIC CONTACT POINT
10 PHOTOGRAPHING LENS
11 SYSTEM CONTROL UNIT
17 DIGITAL SIGNAL PROCESSING UNIT
50 LENS CONTROL UNIT
51R, 51L PIXEL FOR PHASE DIFFERENCE DETECTION
60 MEMORY
70 ELECTRIC CONTACT POINT
171 GAIN CORRECTION PROCESSING UNIT
172 INTERPOLATION CORRECTION PROCESSING UNIT
173 LENS INFORMATION ACQUISITION UNIT
174 CORRECTION METHOD SELECTION UNIT
175 IMAGING PROCESSING UNIT
176 CORRECTION GAIN VALUE GENERATION UNIT

The invention claimed is:

1. An imaging device to which a lens device is detachably mounted, comprising:
   an imaging element that includes multiple pixels for imaging arranged into a two-dimensional array and multiple pixels for phase difference detection on a light receiving surface and that images a photographic subject through the lens device;
   a communication unit that performs communication with the mounted lens device;
   a lens information acquisition unit that acquires lens information that is information specific to the lens device, from the lens device through the communication unit;
   a gain correction processing unit that performs gain correction processing which corrects an output signal of the pixel for phase difference detection in an imaging-obtained image signal that is obtained by the imaging element imaging the photographic subject, by multiplying the output signal by a gain value;
   an interpolation correction processing unit that performs interpolation correction processing which corrects the output signal of the pixel for phase difference detection in the imaging-obtained image signal by replacing the output signal with a signal that is generated using an output signal of the pixel for imaging that is in the vicinity of the pixel for phase difference detection and that detects the same color as the pixel for phase difference detection;
   a correction method selection unit that selects, according to the lens information that is acquired by the lens information acquisition unit, any of a first correction method in which the output signals of all the pixels for phase difference detection in the imaging-obtained image signal are corrected by the interpolation correction processing unit, and a second correction method in which the output signals of all the pixels for phase difference detection in the imaging-obtained image signal are corrected by the gain correction processing unit; and
   an image processing unit that corrects the output signal of the pixel for phase difference detection in the imaging-obtained image signal, using the method that is selected by the correction method selection unit.

2. The imaging device according to claim 1, wherein, when the gain value that corresponds to identification information for identifying the lens device, which is included in the lens information, is not stored in any of the imaging device and the lens device, the correction method selection unit selects the first correction method.

3. The imaging device according to claim 1, wherein, when information necessary for generating the gain value that is determined by combining the mounted lens device and the imaging element is not included in the lens information, the correction method selection unit selects the first correction method.

4. The imaging device according to claim 3, wherein the information necessary for generating the gain value is light beam angle information of the lens device.

5. The imaging device according to claim 4, further comprising:
a correction gain value generation unit that generates the gain value using the light beam angle information and information relating to sensitivity of the imaging element for every light beam angle, when the light beam angle information is included in the lens information.

6. A signal processing method for an imaging device to which a lens device is detachably mounted, the imaging device including an imaging element that includes multiple pixels for imaging arranged into a two-dimensional array and multiple pixels for phase difference detection on a light receiving surface and that images a photographic subject through the lens device, and a communication unit that performs communication with the mounted lens device, the signal processing method comprising:
a lens information acquisition step of acquiring lens information that is information specific to the lens device, from the lens device through the communication unit;
a correction method selection step of according to the lens information that is acquired by the lens information acquisition step, any of a first correction method in which the output signals of all the pixels for phase difference detection in the imaging-obtained image signal are corrected by interpolation correction processing that replaces the output signals with signals that are generated using an output signal of the pixel for imaging that is in the vicinity of the pixel for phase difference detection and that detects the same color as the pixel for phase difference detection, and a second correction method in which the output signals of all the pixels for phase difference detection in the imaging-obtained image signal are corrected by the gain correction processing that corrects the output signals by multiplying the output signals by a gain value; and
an image processing step of correcting the output signal of the pixel for phase difference detection in the imaging-obtained image signal, using the method that is selected in the correction method selection step.

7. A non-transitory computer-readable medium storing a program for causing a computer to perform each step of the signal processing method according to claim 6.

* * * * *